United States Patent
Endo et al.

[11] Patent Number: 5,902,349
[45] Date of Patent: May 11, 1999

[54] NAVIGATION APPARATUS

[75] Inventors: Koichi Endo, Tokyo; Kan Shishido, Wako, both of Japan

[73] Assignees: Alpine Electronics, Inc.; Honda Giken Kogyo Kabushiki Kaisha, both of Tokyo, Japan

[21] Appl. No.: 08/733,745

[22] Filed: Oct. 16, 1996

[30] Foreign Application Priority Data

Dec. 28, 1995 [JP] Japan ................................. 7-342646

[51] Int. Cl.$^6$ ...................... G06F 165/00; G08G 1/123
[52] U.S. Cl. ...................... 701/202; 701/209; 701/210; 340/990; 340/995
[58] Field of Search ................................. 701/201, 202, 701/208, 209, 210, 211; 340/988, 990, 995

[56] References Cited

U.S. PATENT DOCUMENTS

| | | | |
|---|---|---|---|
| 5,559,511 | 9/1996 | Ito et al. | 701/201 |
| 5,652,706 | 7/1997 | Morimoto et al. | 701/210 |
| 5,659,476 | 8/1997 | Lefebvre et al. | 701/201 |
| 5,689,423 | 11/1997 | Sawada | 340/995 |
| 5,774,073 | 6/1998 | Mackawa et al. | 701/210 |

*Primary Examiner*—Tan Q. Nguyen
*Attorney, Agent, or Firm*—Nikaido, Marmelstein, Murray & Oram LLP

[57] ABSTRACT

A navigation apparatus is provided which can search out, even if a vehicle goes off of a guide route, a route which allows the vehicle to return to the guide route so that the travel distance to a destination may be comparatively short. A guide route control unit calculates, when the vehicle is in an off-route condition, rectilinear distances from a vehicle position to nodes on the guide route and route distances from the nodes to the destination along the guide route. The control unit modifies the rectilinear distances and the route distances using first and second weighting coefficients, respectively, which are set so that the second weighting coefficient is greater than the first weighting coefficient, and calculates sums of the rectilinear and route distances modified with the first and second weighting coefficients, respectively. The control unit then determines one of the nodes which exhibits the lowest one of the sums as a return point, and searches for a route from the vehicle position to the return point. The navigation apparatus guides the vehicle to the return point along the route thus searched out.

12 Claims, 19 Drawing Sheets

— (3) GUIDE ROUTE
• (4) NODE

| (1) GUIDANCE BY VOICE |
| (2) ADVANCE STRAIGHT FORWARDLY AHEAD |
| (3) TURN TO THE RIGHT AHEAD |
| (4) TURN TO THE OBLIQUE RIGHT UPWARD AHEAD |
| (5) TURN TO THE LEFT AHEAD |
| (6) TURN TO THE OBLIQUE LEFT UPWARD AHEAD |

NAVIGATION APPARATUS

BACKGROUND OF THE INVENTION

This invention relates to a navigation apparatus, and more particularly to a navigation apparatus wherein a guide screen for guiding a vehicle, during traveling, to a destination along a guide route, is displayed on a display apparatus.

In a navigation apparatus which guides a vehicle during traveling to allow a driver to arrive readily at a desired destination, the position of the vehicle is detected and map data around the position of the vehicle is read out from a CD-ROM (compact disk read only memory). Then, an image of the map is drawn on a display screen, and a vehicle position mark (self-vehicle position mark) is drawn in an overlapping relationship at a predetermined location on the image of the map. Then, as the current position varies due to movement of the vehicle, the self-vehicle position mark on the screen is moved or alternatively, the self-vehicle mark is fixed at a predetermined position such as the center of the screen, while the map is scrolled so that map information around the vehicle position may always be observed at a glance.

A navigation apparatus of the type described above has a route guiding function for setting a guide route from a starting point to a destination, displaying the guide route on a map and giving intersection guidance which is an enlarged view of the intersection and the advancing direction of the vehicle. If a starting point and a destination are inputted, then a guide route controller of the navigation apparatus automatically determines an optimum guide route, and successively stores in a guide route memory, nodes (longitudes and latitudes) which define the guide route. Then, upon actual traveling, a portion of the guide route which is included in a map display area of the screen is searched from among the train of nodes stored in the guide route memory, and the guide route portion searched out or determined is displayed in a manner which distinguishes it from other roads. Further, when the vehicle reaches a predetermined distance from an approaching intersection to which the vehicle is advancing, an intersection location map (an enlarged view of the intersection and an arrow mark indicating a direction in which the vehicle is to advance across the intersection) is displayed so that the driver can recognize which road the vehicle should advance along or in which direction the vehicle should advance. Further, if the vehicle goes off of the guide route and enters an off-route condition, then the navigation apparatus searches for (calculates) a route from the current position of the vehicle to a suitable return point on the guide route so that it guides the vehicle to the destination via the return point.

FIG. 15 is a schematic view of an example of a guide route display. Referring to FIG. 15, a self-vehicle mark is denoted at CM, a guide route RT is denoted by a broken line, and an intersection enlarged view of an intersection Q is denoted at ELI. In the intersection enlarged view ELI of intersection Q, intersection composing links B1 to B4 are first represented by link figures of a predetermined thickness, and then the link figure representations are converted into and displayed in a perspective view. To each link, the name of a location to which the link leads (Ohmiya, Tokorozawa, Urawa Station and Nihonbashi in FIG. 15) is additionally displayed, and an arrow mark ARR indicating the direction of the guide route is displayed. In order to draw the intersection enlarged view, the circumferential angle of 360° around the intersection Q is equally divided into eight (8) angular regions with reference to an intersection entering direction, the direction of the link L1 along which the vehicle comes into the intersection as shown in FIG. 16. The eight (8) angular regions are the entering opposite direction region A1, oblique left-downward region A2, left-turn region A3, oblique left-upward region A4, straightforward advancing region A5, oblique right-upward region A6, right-turn region A7 and oblique right-downward region A8. Then, it is determined as to which regions the intersection composing links individually belong, and a intersection enlarged view which has branches in directions corresponding to the angular regions to which the intersection composing links belong, is produced and drawn into an image.

FIG. 17 is a table illustrating messages used for guidance at an intersection by voice. Referring to FIG. 17, guidance is provided such that, for example, when the direction of the outgoing link is the right-turn direction, the voice message "turn to the right ahead" is given, but when the direction of the outgoing link is the oblique right-upward direction, the message "turn to the oblique right-upward ahead" is given. It is to be noted that some navigation apparatus do not give an intersection guidance when a vehicle should advance straightforwardly across an intersection.

The foregoing description relates to a navigation apparatus used in Japan. The navigation apparatus used in United States and some other countries does not display, during traveling of a vehicle, a map image including a map and a vehicle position mark but rather displays such a guide screen as shown in any of FIGS. 18A to 18F and gives a guidance of an advancing direction by voice. In the guide screens of FIGS. 18A to 18F, a distance to an intersection is displayed as CDS, a distance to a destination is displayed at DDS, an indication that guidance by voice is in service is displayed at VCD, a current time is displayed at TDL, and a guide image indicating the advancing direction is displayed at NVG. When an intersection or a branch is not present on a guide route within a predetermined distance from a current position of the vehicle, a guide screen which indicates straightforward advancement, as seen in FIG. 18A, is displayed; when an approaching intersection is present within the predetermined distance, an enlarged view of the intersection or a branch and an arrow mark which indicates an advancing direction are displayed, as seen in FIGS. 18B to 18E; and when a U-turn is required, a U-turn figures as shown in FIG. 18F are displayed. Then, when the vehicle reaches a predetermined distance from a branch or an intersection, the navigation apparatus guides the advancing direction by voice.

As described above, the navigation apparatus in the United States and some other countries detects the position of a vehicle, reads map data corresponding to the vehicle position from a map data base such as a CD-ROM, and if an approaching intersection or branch is determined on the guide route, within a predetermined distance from the current position of the vehicle, displays an enlarged figure of the intersection or branch using map data similar to a display of an enlarged representation of an intersection in Japan and also displays an advancing direction of the vehicle with an arrow mark while giving a guidance of a direction in which the vehicle is to advance by voice. On the other hand, when an approaching branch or intersection is not determined within the predetermined distance, then the navigation apparatus displays a guide screen which indicates straightforward advancement of the vehicle. Then, if the vehicle goes off of the guide route (enters an off-route condition), the navigation apparatus searches for a route from the current position of the vehicle to a predetermined point, the return point, on the guide route and guides the vehicle to a destination via the return point. Further, when a guide route is to be set, the navigation apparatus displays a map image so that a guide route can be set by inputting a starting point and a destination.

Consequently, the navigation apparatus in Japan and the navigation apparatus in the United States have almost the same internal constructions but differ only in the control of the display screen.

As a method of determining the current position of a vehicle using a navigation apparatus, two methods are available including a first self-contained navigation measuring method wherein the position of a vehicle is determined using self-contained distance and orientation sensors carried on the vehicle (a dead reckoning method) and a second satellite navigation method which is based on the GPS (Global Positioning System) which makes use of artificial satellites. The determination of a vehicle position by the self-contained navigation method allows measurement of the vehicle position at a comparatively low cost, but has a problem in that the position cannot be measured with a high degree of accuracy due to errors of the sensors and requires correction processing such as map matching. Meanwhile, the satellite navigation method allows detection of an absolute position, but the measurement position data obtained include drift position errors caused by various factors, and the nominal tolerance of the U.S. organization is less than 100 m (95 percent in accuracy). The satellite navigation method has another problem in that position detection is disabled at a location where radio waves are interrupted such as when the vehicle is in a tunnel or behind a building.

Therefore, a recent vehicle-carried navigation apparatus makes use of both the self-contained navigation method and the satellite navigation method such that a position and an orientation are usually estimated using the self-contained navigation method and the estimated vehicle position is corrected by a map matching process to define an actual vehicle position on a road being traveled. Then, if map matching is disabled by some cause and the vehicle position measured using the self-contained navigation method is displaced by a large amount from the actual vehicle position such that the distance between the measured vehicle position and the vehicle position measured making use of the GPS exceeds an allowable error range, then the vehicle position is corrected to the position measured or determined making use of the GPS, after which the vehicle position is drawn additionally to the traveling road by the map matching process to define the actual vehicle position.

In the self-contained navigation method, the vehicle position is detected by integration based on outputs of the distance sensor and the relative orientation sensor. FIG. 19 illustrates a vehicle position detection method by the self-contained navigation method. Referring to FIG. 19, it is assumed that the distance sensor outputs a pulse each time the vehicle travels a certain unit distance $L_0$, and the reference orientation ($\theta=0$) is set to the positive direction of the X-axis while the counterclockwise direction from the reference orientation is taken as a +direction. The vehicle position in the immediately preceding detection cycle, is represented by a point $P_0$ ($X_0, Y_0$), the absolute orientation of the vehicle advancing direction at the point $P_0$ is represented by $\theta_0$, and the output of the relative orientation sensor when the vehicle travels the unit distance $L_0$, is represented by $\Delta\theta_1$. The variation of the vehicle position is given by:

$$\Delta X = L_0 \cdot \cos(\theta_0 + \Delta\theta_1)$$

$$\Delta Y = L_0 \cdot \sin(\theta_0 + \Delta\theta_1)$$

Consequently, the estimated orientation $\theta_1$ of the vehicle advancing direction and the estimated vehicle position ($X_1, Y_1$) of the vehicle at the point $P_1$ in the current detection cycle can be calculated by vector synthesis using the following equations:

$$\theta_1 = \theta_0 + \Delta\theta_1 \tag{1}$$

$$X_1 = X_0 + \Delta X = X_0 + L_0 \cdot \cos(\theta_0 + \Delta\theta_1) \tag{2}$$

$$Y_1 = Y_0 + \Delta Y = Y_0 + L_0 \cdot \sin(\theta_0 + \Delta\theta_1) \tag{3}$$

Accordingly, if absolute orientation and position coordinates of a vehicle at a starting point are given, then each time the vehicle thereafter travels a unit distance, the vehicle position can be detected (estimated) on a real time basis by repeating the calculation of the equations (1) to (3).

With the self-contained navigation method, however, as the travel of the vehicle proceeds, errors are accumulated so that the estimated vehicle position may be displaced from a road. Therefore, the estimated vehicle position is compared with road data to correct the estimated vehicle position to an actual vehicle position on the road by a map matching process. Map matching, based on a projection method, is displayed in FIGS. 20 and 21. Referring to FIGS. 20 and 21, it is assumed that the current vehicle position is a point $P_{i-1}$ ($X_{i-1}, Y_{i-1}$) and the vehicle orientation is $\theta_{i-1}$ (in FIG. 20, it is shown that the point $P_{i-1}$ does not coincide with a road Rda). If the relative orientation when the vehicle travels a fixed distance $L_0$ (for example, 10 m) from the point $P_{i-1}$ is $\Delta\theta_i$, then the estimated vehicle position $P_i'$ ($X_i', Y_i'$) and the estimated vehicle orientation $\theta_i$ at the point $P_i'$ are calculated, by the self-contained navigation method, using the following equations:

$$\theta_i = \theta_{i-1} + \Delta\theta_i$$

$$X_i' = X_{i-1} + L_0 \cdot \cos\theta_i$$

$$Y_i' = Y_{i-1} + L_0 \cdot \sin\theta_i$$

In this instance, first a link which is an element or segment which forms the road and which satisfies the following requirements is searched for. In particular, the link is included within a radius of 200 m from the estimated vehicle position $P_i'$; a normal line can be drawn to the link; the link defines an angle within a fixed range (for example, within 45°) with respect to the estimated vehicle orientation $\theta_i$ at the estimated vehicle position $P_i'$; and the normal line drawn from the estimated vehicle position $P_i'$ to the link is within a fixed distance (for example, 100 m). Here, a link Lka1 (straight line interconnecting nodes $Na_0$ and $Na_1$) of an orientation $\theta a_1$ on a road Rda and another link Lkb1 (straight line interconnecting nodes $Nb_0$ and $Nb_1$) of another orientation $\theta b_1$ on another road Rdb are searched out. Second, the lengths of normal lines Rlia and Rlib drawn from the estimated vehicle position $P_i'$ to the links $Lka_1$ and $Lkb_1$, are calculated. Third, a coefficient Z is calculated using a suitable one of the following equations:

$$Z = dL \cdot 20 + d\theta \cdot 20 \quad (d\theta \leq 35°) \tag{4}$$

$$Z = dL \cdot 20 + d\theta \cdot 40 \quad (d\theta > 35°) \tag{4}'$$

where dL is the length of a normal line drawn from the estimated vehicle position $P_i'$ to a link (distance from the estimated vehicle position to the link), and $d\theta$ is the angle defined by the estimated vehicle orientation $\theta_i$ and the link. As the angle $d\theta$ increases, the weighting coefficient increases.

Fourth, after the coefficient values Z are obtained, the links are determined which satisfy the following equations (1), (2) and (3):

(1) the distance dL≦75 m (maximum drawing distance: 75 m)

(2) the angular difference dθ≦30° (maximum drawing angle: 30°) and (3) the coefficient value Z≦1,500.

Then, one of the links whose coefficient value exhibits the lowest value is determined as a matching candidate (optimum road). Here, the link $Lka_1$ is determined as a matching candidate. Fifth, a traveling locus interconnecting the points $P_{i-1}$, and $P_i'$ is parallely moved in the direction of the normal line Rlia until the point $P_{i-1}$ comes to a point on the link Lka1 (or on an extension line of the link $Lka_1$) to determine movement points $PT_{i-1}$ and $PT_i'$ of the points $P_{i-1}$ and $P_i'$. Finally, the point $PT_{i-1}$ is moved along an arc centered at the point $PT_{i-1}$ until it comes to a point on the link $LKa_1$ or the extension line of the link Lka1, to determine a moved point, which is determined as the actual vehicle position $P_i$ ($X_i$, $Y_i$). It is to be noted that the vehicle orientation at the actual vehicle position $P_i$ is determined to remain $θ_i$. On the other hand, when the $P_{i-1}$ which is the vehicle position in the immediately preceding detection cycle remains on the road RDa, the moved point $PT_{i-1}$ coincides with the point $P_{i-1}$.

In a navigation apparatus, it is continually checked whether or not an optimum road determined by map matching processing forms a guide route, and if the optimum road does not form the guide route, then it is determined that the vehicle has gone out of the guide route and has entered an off-route condition. If an off-route condition is entered, and if the navigation apparatus is in an automatic route search mode, it immediately detects, based on the vehicle position, one of nodes on the guide route which has not been passed as yet and exhibits the smallest linear distance from the vehicle position, that is, a return point, and searched for a route along which the vehicle is to be guided from the vehicle position to the return point. The navigation apparatus then guides the vehicle to the guide route along the route thus searched out. On the other hand, if the navigation apparatus is not in an automatic route search mode, the driver will manually operate a remote controller or some other element to instruct the navigation apparatus to search for a route. In response to the instruction, the navigation apparatus detects a return point, searches for a route along which the vehicle is to be guided from the vehicle position to the return point, and guides the vehicle to the guide route along the route thus searched out.

However, conventional route searching when a vehicle is in an off-route condition, has various problems.

The first problem resides in that it sometimes occurs that the shortest route for the vehicle to return to the guide route cannot be selected. FIG. 22 illustrates an example of one of such situations. Referring to FIG. 22, if a vehicle travels on a guide route NVRT indicated by a solid line and enters an off-route condition at a point CP, then if the navigation system is in an automatic route search mode, route searching is started immediately, but if the navigation system is not in an automatic route search mode, route searching is not started until the system is instructed to perform route searching. In the route searching, the navigation apparatus detects, as a return point, a non-passed node C on the guide route which exhibits the shortest rectilinear distance from the vehicle position (point A). Then, the navigation apparatus performs a search for a route from the vehicle position A to the return point C as indicated by a broken line and then guides the vehicle along the route thus searched out. However, the travel distance to the destination is shorter if the vehicle returns to the guide route NVRT along a route RT from the point A to a point B than when the route detected by the navigation apparatus is taken. In other words, the conventional method sometimes fails to select the shortest route for the vehicle to return to the guide route. It is to be noted that the reason why the route of CP→A→B is not selected upon initial guide route searching is that a road having comparatively a great width is preferentially selected.

The second problem resides in that a route to a return point becomes commonplace. In the conventional route searching, route searching is performed from both the vehicle position and the return point while the vehicle is traveling, and when the routes from both of them intersect each other, the two routes are synthesized to determine a route (broken line) along which the vehicle should return from the vehicle position to the return point. However, with the method just described, since the vehicle is traveling, the route is determined after the vehicle runs a considerable distance. Consequently, a second off-route condition may be entered, and the route searched out cannot be used.

The third problem resides in that, if an off-route condition is entered near the destination, then a route which guides the vehicle away from the destination or another route which makes the vehicle take a round about way to the destination, is searched out. FIGS. 23 and 24 illustrate such a situation. Referring to FIGS. 23 and 24, a guide route is denoted at NVRT (indicated by cross hatching), a vehicle is denoted at CR, and a destination is denoted at DSP. Referring first to FIG. 23, if an off-route condition from the guide route is entered, then if the navigation apparatus is in an automatic route search mode, route searching is started immediately. In this instance, since the node on the guide route which is nearest from the point A is the point B, if a route from the vehicle position A in the advancing direction toward the point B is searched for, a route indicated by the broken line is searched out and guides the vehicle away from the destination. On the other hand, referring to FIG. 24, if the vehicle enters an off-route condition from the guide route NVRT and the navigation apparatus is not in an automatic route search mode, then the navigation apparatus is instructed to perform route searching using a remote controller after the vehicle moves to the point A. Since the nearest node on the guide route is the node B (the destination is not on any node), a round about way from the point A to the point B is searched out.

SUMMARY OF THE INVENTION

It is an object of the present invention to provide a navigation apparatus which can search out or determine, even if a vehicle goes off of a guide route and enters an off-route condition, a route which allows the vehicle to return to the guide route so that the travel distance to a destination is comparatively short.

It is another object of the present invention to provide a navigation apparatus wherein a route searched out or determined after a vehicle enters an off-route condition is not commonplace and the vehicle can be guided to a guide route along the route thus searched out.

It is a further object of the present invention to provide a navigation apparatus which can search out or determine, when a vehicle enters an off-route condition near a destination, a route along which the vehicle can be guided by the shortest possible travel distance to the destination and guide the vehicle along the route thus searched out.

In order to attain the objects described above, according to an aspect of the present invention, there is provided a navigation apparatus for guiding a vehicle to a destination along a guide route. The navigation apparatus comprises an off-route detection means for detecting an off-route condition where the vehicle runs along a road displaced from the guide route, a guide route searching means for searching or determining, when the vehicle is in the off-route condition, a route to return the vehicle to the guide route, and a display means for displaying an image for guiding the vehicle along the guide route. The guide route searching means calculates, when the vehicle is the an off-route condition, automatically or in response to an instruction to search for a route, rectilinear distances from the position of the vehicle to nodes on the guide route and route distances from the nodes to the destination along the guide route, modifies or corrects the rectilinear distances and the route distances using first and second weighting coefficients, respectively, which are set so that the second weighting coefficient is higher than the first weighting coefficient; calculates sums of the rectilinear and route distances modified by the first and second weighting coefficients, respectively; detects one of the nodes which exhibits the lowest one of the sums as a return point; and searches for or determines a route from the position of the vehicle to the return point. The display means displays an image for guiding the vehicle to the return point along the route searched out or determined by the guide route searching means.

In the navigation apparatus, if the vehicle goes off of the guide route and enters an off-route condition, then automatically or in response to an instruction to search for a route, the rectilinear distances from the position of the vehicle to the nodes on the guide route and the route distances from the nodes to the destination along the guide route are calculated first and then corrected using first and second weighting coefficients, respectively, which are set so that the second weighting coefficient is higher than the first weighting coefficient. Then, sums of the rectilinear and route distances corrected with the first and second weighting coefficients, respectively, are calculated, and one of the nodes which exhibits the lowest one of the sums is determined as a return point. Thereafter, a search or determination is made for a route from the position of the vehicle to the return point, and the vehicle is guided to the return point along the route thus searched out. Consequently, even if the vehicle enters an off-route condition, the navigation apparatus can search for a route so that the travel distance to the destination may be comparatively short.

Preferably, the route search means searches for or determines a route in a direction in which the vehicle is advancing toward the return point from one direction. In this instance, even if the vehicle is traveling, since the vehicle is present on the route searched out, the navigation apparatus can thereafter guide the vehicle toward the guide route using the route searched out.

According to another aspect of the present invention, there is provided a navigation apparatus for guiding, the vehicle to a destination along a guide route. The navigation apparatus comprises an off-route detection means for detecting an off-route condition when the vehicle travels along a road displaced from the guide route, a guide route searching means for determining, when the vehicle is in the off-route condition, a route to return the vehicle to the guide route, and a display means for displaying an image for guiding the vehicle along the guide route. The guide route searching means calculates, when the vehicle is in the off-route condition, automatically or in response to an instruction to search for a route, the rectilinear distance from a position of the vehicle to the destination, searched for the guide route from the position of the vehicle to the destination when the rectilinear distance is equal to or smaller than a preset value, but detects, when the rectilinear distance is greater than the preset value, a return point on the guide route, along which the vehicle has traveled, and searches for a route from the position of the vehicle to the return point. The display means displays an image for guiding the vehicle to the destination along the route determined by the guide route searching means.

In the navigation apparatus, the rectilinear distance from the position of the vehicle to the destination is calculated, and when the rectilinear distance is equal to or smaller than the preset value, the guide route from the position of the vehicle to the destination is searched for. However, when the rectilinear distance is greater than the preset value, a return point on the guide route, along which the vehicle has traveled, is determined, and a route from the position of the vehicle to the return point is searched for. Then, the navigation apparatus guides the vehicle to the return point along the route thus searched out. Consequently, even if the vehicle enters an off-route condition, the navigation apparatus can search for a route so that the travel distance to the destination may be minimized.

Preferably, when the rectilinear distance from the position of the vehicle to the destination is greater than the preset value, the guide route searching means calculates rectilinear distances from the position of the vehicle to nodes on the guide route and route distances from the nodes to the destination along the guide route; corrects the rectilinear distances and the route distances using first and second weighting coefficients, respectively, which are set so that the second weighting coefficient is higher than the first weighting coefficient; calculates sums of the rectilinear and route distances corrected with the first and second weighting coefficients, respectively; and determines one of the nodes which exhibits the lowest one of the sums as a return point. In this instance, when the rectilinear distance from the position of the vehicle to the destination is greater than the preset value, since one of the nodes on the guide route which exhibits the lowest one of the sums of corrected distances is determined as a return point and a route is searched for so that the vehicle may return to the return point, the navigation apparatus can return the vehicle to the guide route so that the travel distance to the destination may be comparatively short.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1:
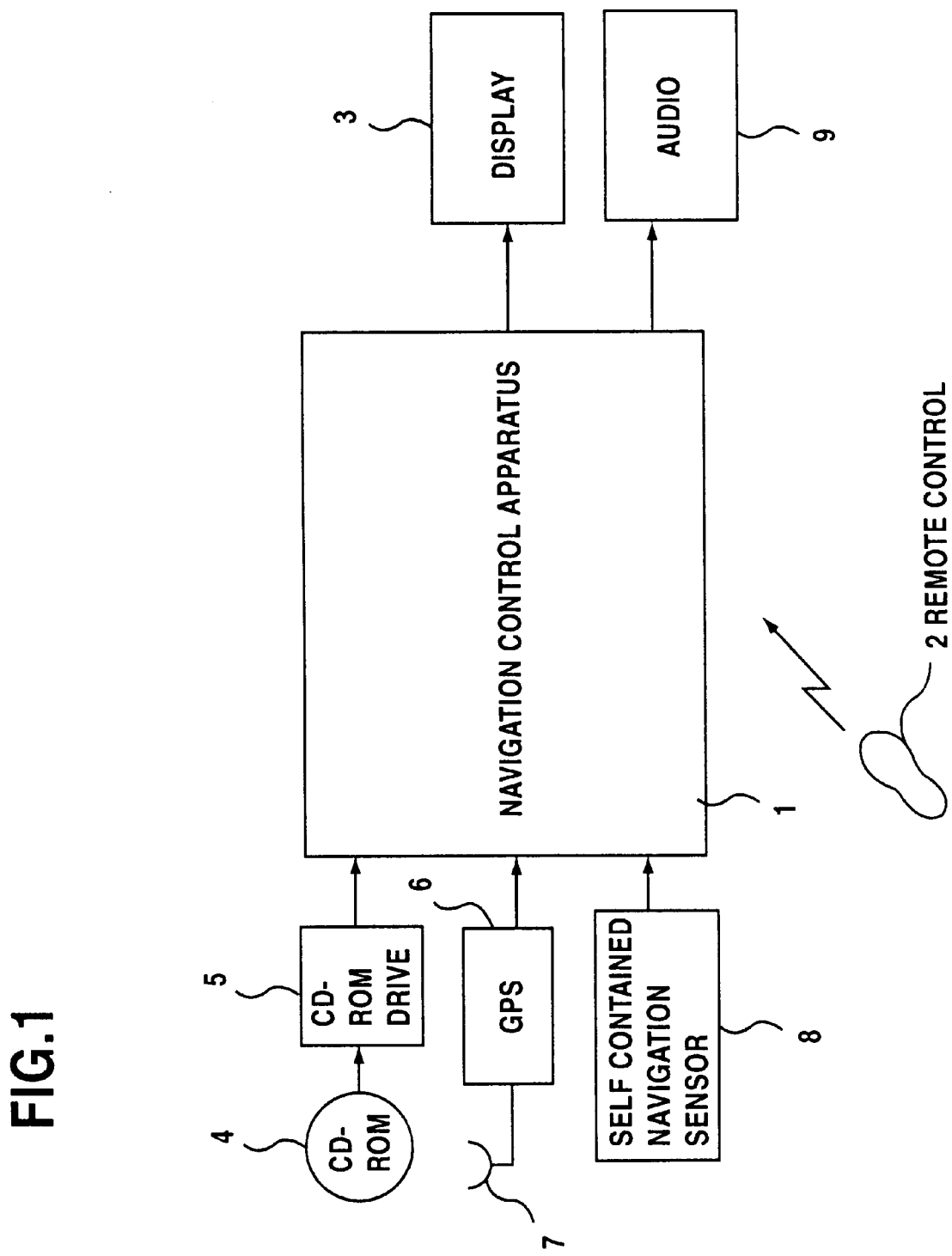
FIG. 1 is a block diagram of a navigation apparatus to which the present invention is applied.

FIG. 1 shows a general construction of a navigation system to which the present invention is applied. Referring to FIG. 1, the navigation system shown includes an navigation control apparatus 1, a manually operable device 2 such as a remote controller which is manually operated to input various instructions to the navigation control apparatus 1 and set a guide route and various data. A display apparatus 3 displays a map, a guide route, an intersection location map, a menu, etc. and a CD-ROM 4 in a CD-ROM drive 5, serves as a map data base in which map information is stored. A GPS receiver 6 receives radio waves from several artificial satellites, to measure a current position and orientation of a vehicle, and a multi-beam antenna 7 receives the radio waves from the artificial satellites. The system also includes a self-contained navigation sensor 8, and an audio apparatus 9 which may be car audio system for outputting a guidance voice for an intersection.

The multi-beam antenna 7 performs three-dimensional and two-dimensional position measurement processing to calculate the position and the orientation of the vehicle, the orientation being defined as a direction of a line interconnecting a vehicle position obtained by a current detection cycle and another vehicle position obtained during the preceding sampling time ΔT, and outputs the calculated position and orientation together with the time of the measurement. Though not shown in FIG. 1, the self-contained navigation sensor 8 includes a relative orientation sensor (angular sensor) such as an oscillation gyro for detecting an angle of turning movement of the vehicle, and a distance sensor which generates a pulse each time the vehicle travels a predetermined distance.

Figure 2:
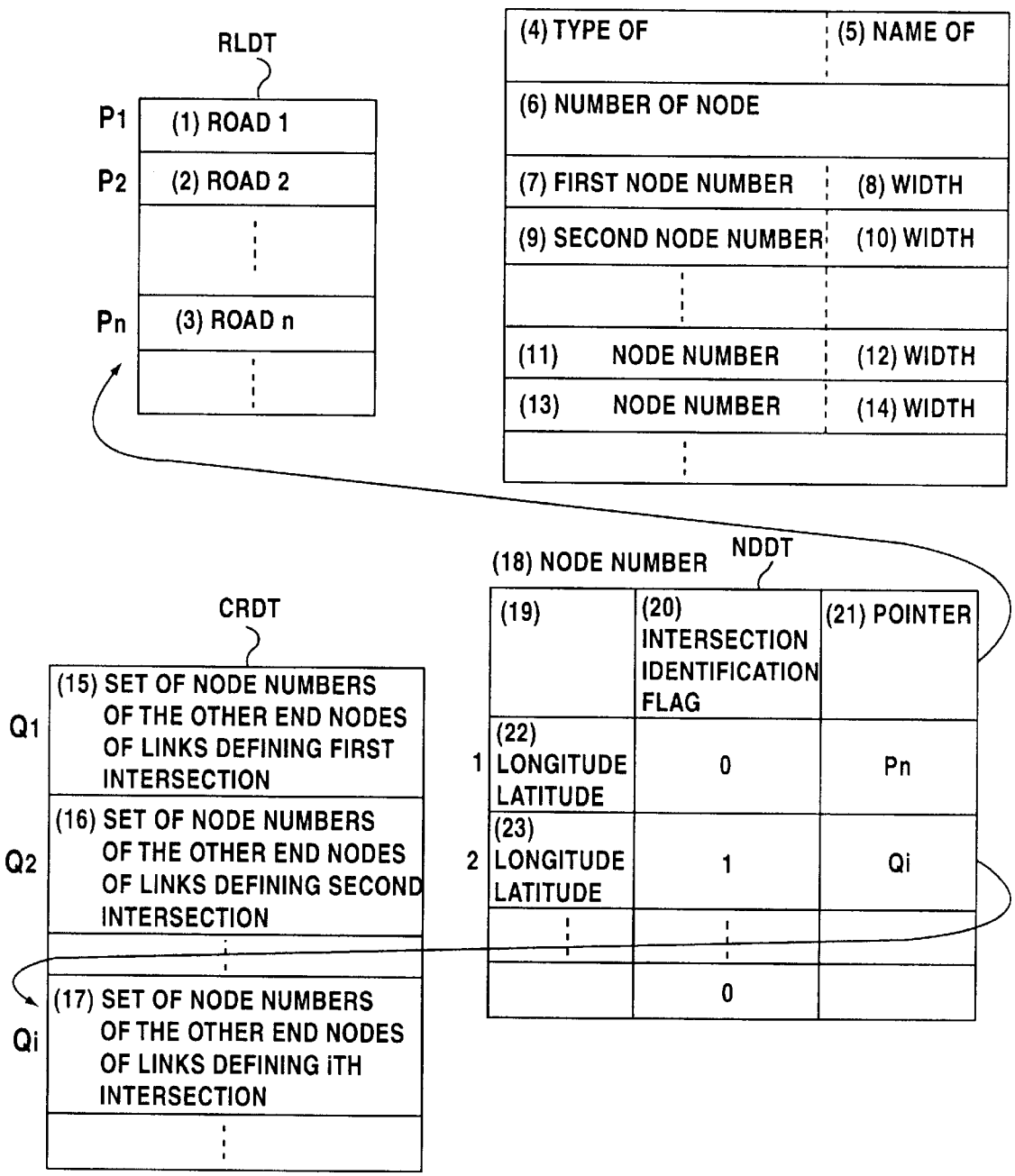
FIG. 2 is a diagrammatic view illustrating a construction of road data in map data used in the navigation apparatus of FIG. 1.

The map information stored on the CD-ROM 4 is composed of 1) a road layer, 2) a background layer for displaying an object on a map, 3) a character layer for displaying characters of the name of a city, a town or a village, and 4) an IIS layer in which IIS (Integrated Information Service) information is stored. Of these layers, the road layer includes road link data RLDT, node data NDDT and intersection data CRDT as shown in FIG. 2.

The road link data RLDT provides attribute information of the roads and includes data of the total node numbers on the road links, numbers of the nodes forming the roads, road numbers and names, types of roads, e.g., national road, expressway, local district road, etc.

The intersection data CRDT is provided for the individual intersections on the map and represents sets of nodes, called intersection composing nodes, which are nearest to the intersections from among nodes on those links connected to the intersections. The node data NDDT is a list of all nodes defining the roads and includes, for each node, position information, i.e., the latitude and the longitude, an intersection identification flag representing whether or not the node is an intersection, a pointer which represents intersection data when the node is an intersection but, when the node is not an intersection, represents a road link to which the node belongs, etc.

Figure 3:
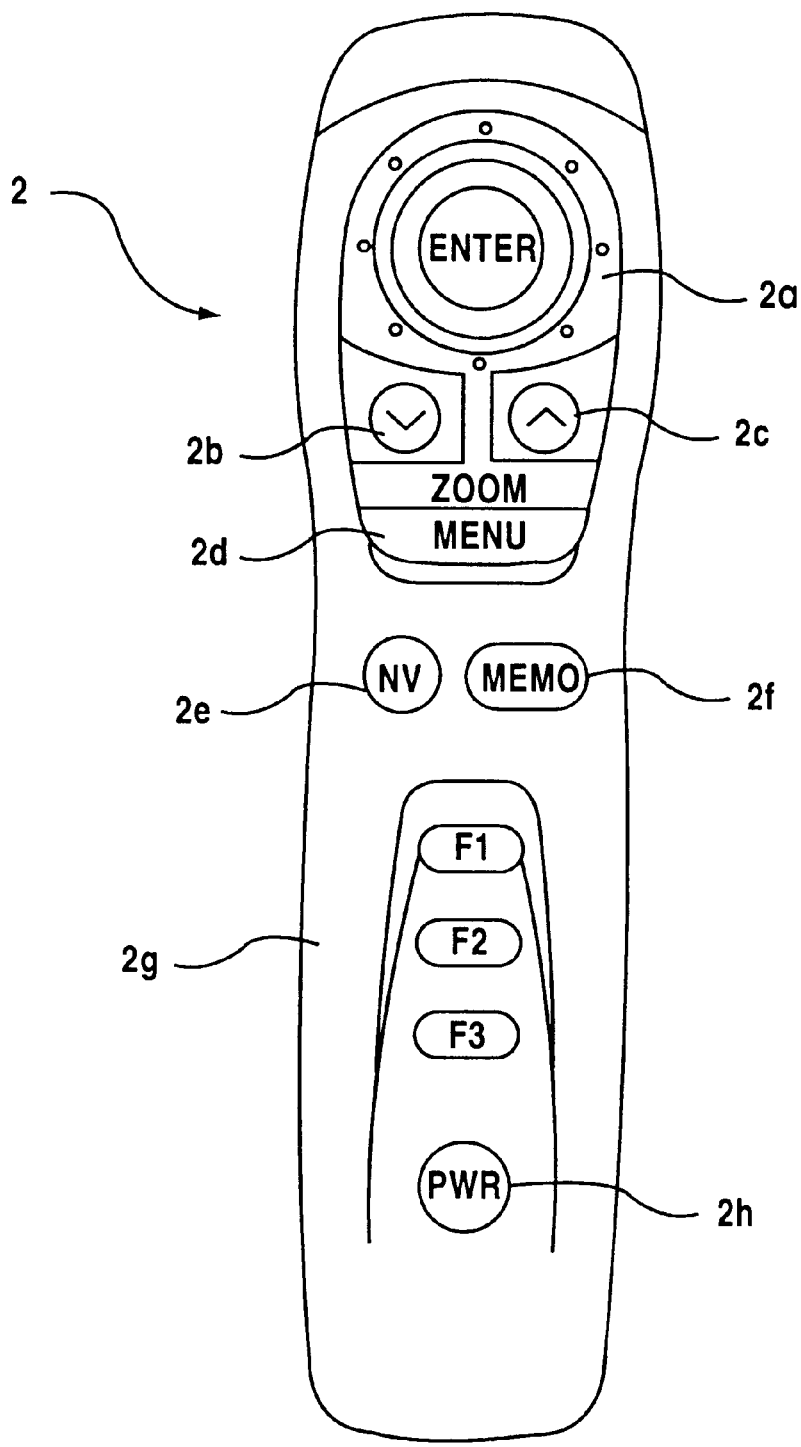
FIG. 3 is a schematic view of a remote controller shown in FIG. 1.

FIG. 3 shows a remote controller. Referring to FIG. 3, the remote controller 2 includes a joy-stick key 2a which is manually operated to move a cursor (called focus), a self-vehicle mark or some other mark in any of eight directions relative to a displayed map, and to move a menu selection bar in the leftward, rightward, upward and downward direction on a display screen in order to select a desired menu item or to select a menu. The remote controller 2 further includes an enlargement key 2b which is manually operated to display a map of a detail level, a reduction key 2c which is manually operated to display a wide area map, and a menu key 2d which is manually operated to display a menu. The remote controller 2 further includes a navigation key (NV key) 2e which is manually operated to display a map of a region in which the vehicle position is present together with the self-vehicle mark, a memory key (MEMO key) 2f which is manually operated to store a desired location into a memory, a function key 2g to which a function which is used frequently is set, to allow selection of the function, and a power supply key 2h.

The navigation apparatus can be placed into an automatic route search on mode by manually operating the joy-stick key 2a to display an automatic route search mode on/off indication on the display screen and select the "on" alternative, or can be placed into an automatic route search office mode by manually operating the joy-stick key 2a to select the "off" alternative. Further, when the vehicle enters an off-route condition while the navigation apparatus is in the automatic route search on mode, then the navigation apparatus automatically searches for a route. On the other hand, when the navigation apparatus is in the automatic route search off mode, the navigation apparatus can be instructed to start route searching by depressing the navigation key 2e, while the vehicle is traveling.

Figure 4:
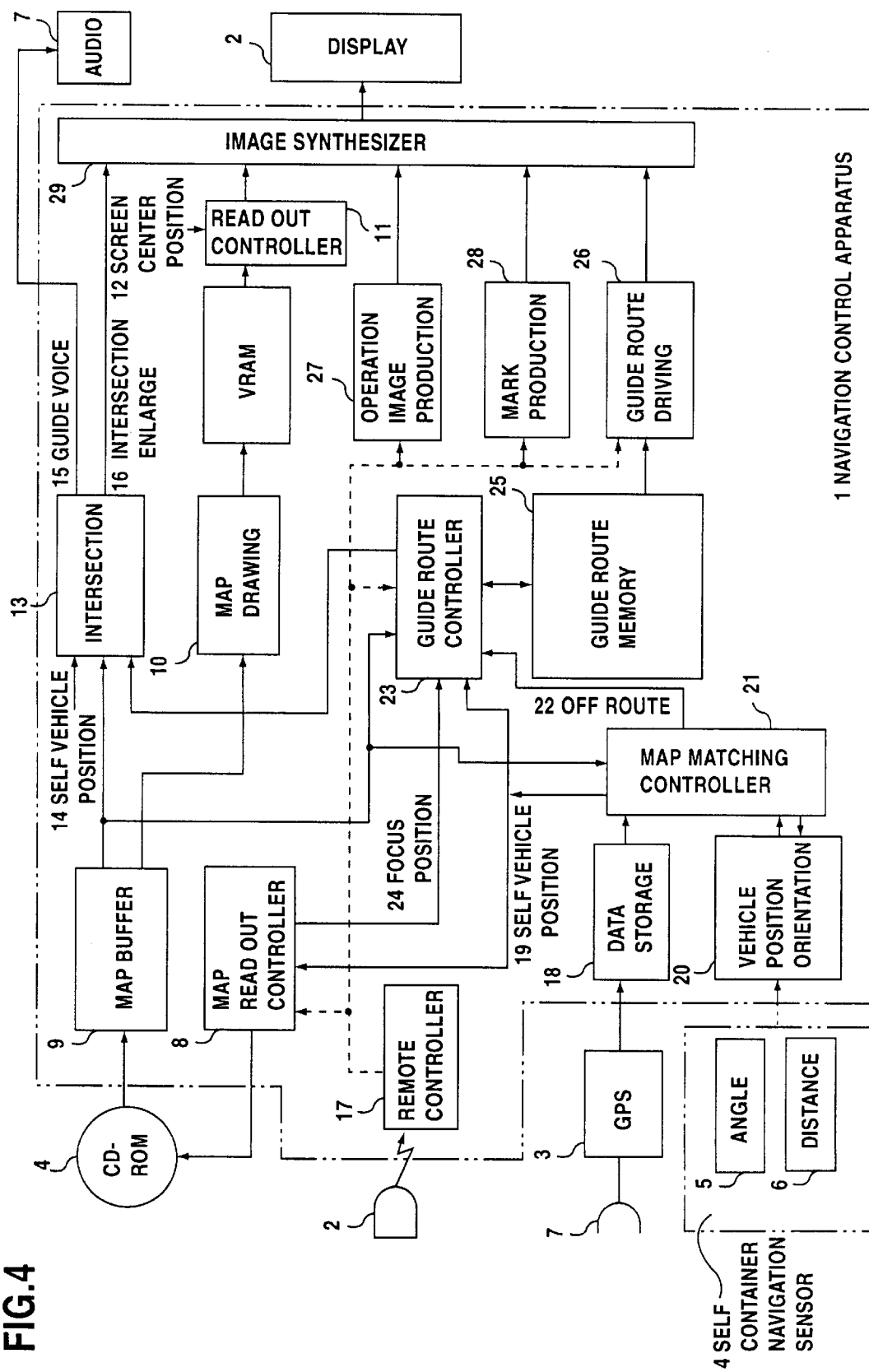
FIG. 4 is a block diagram showing a detailed construction of a navigation control apparatus shown in FIG. 1.

FIG. 4 shows a detailed construction of the navigation control apparatus. Referring to FIG. 4, the navigation control apparatus 1 is shown together with the remote controller 2, the display apparatus 3, the CD-ROM 4 on which map information is stored. The GPS receiver 6, the multi-beam antenna 7, the self-contained navigation sensor 8, and the audio apparatus 9. The self-contained navigation sensor 8 includes a self-contained navigation sensor (angle sensor) 8a such as an oscillation gyro or the like for detecting an angle of turning movement of the vehicle, and a distance sensor 8b which generates a pulse each time the vehicle travels a predetermined distance.

The navigation control apparatus 1 includes a map read-out controller 11 which (1) calculates a focus position (the position of the center of the screen represented in longitude and latitude) when a map moving operation or a map selecting operation is being performed using the joy-stick key, the map reduction or enlargement key or the like and (2) reads out predetermined map information from the CD-ROM 4 based on the self-vehicle position, the focus position or the like. The navigation control apparatus 1 further includes a map buffer 12 for storing map information read out from the CD-ROM 4. In order to allow scrolling of a map, which will be hereinafter described, information from a plurality of maps (units) around the self-vehicle position or the focus position such as, for example, information from a display of 3×3 units is read out from the CD-ROM 4 and stored into the map buffer 12. The navigation control apparatus further includes a map drawing section 13 for generating a map image using map information stored in the map buffer 12, a random access memory 14 for storing the map image, and a read-out controller 15 for varying the position of map information for one image to be read out from the VRAM 14 based on the position of the center of the screen (self-vehicle position, focus position) and to scroll a map being displayed in accordance with the movement of the self-vehicle position or the focus position.

The navigation control apparatus 1 further includes an intersection guidance section 16 which gives guidance re an approaching intersection by means of a display image or voice. In particular, during actual route guidance, when the vehicle reaches a predetermined distance from the approaching intersection, the intersection guidance section 16 causes a location map of the intersection which is an enlarged view of the intersection and an arrow mark of a direction in which the vehicle is to advance toward the destination, to be displayed on the screen and also gives guidance of the direction in which the vehicle is to be advanced by voice. The navigation control apparatus 1 further includes a remote-controller control section 17 for receiving a signal generated in response to the manual operation of the remote controller 2 and delivering a required instruction to a relevant component, a GPS data storage section 18 for storing GPS data from the GPS receiver 6, a vehicle position-orientation calculation section 19 for calculating a self-vehicle position which is an estimated vehicle position and a vehicle orientation based on the output of the self-contained navigation sensor 8. Still further, the control apparatus 1 includes a map matching controller 20 for performing map matching processing using a projection method based on map information stored in the map buffer 12 as well as the estimated vehicle position and the vehicle orientation each time the vehicle travels a predetermined distance, for example, 10 m, to correct the position of the vehicle so that it remains on the route on which the vehicle is traveling. When the vehicle position is corrected to a position on some road, if the road does not form the guide route, then the map matching controller 20 determines that the vehicle has gone off of the guide route and outputs an off-route signal.

Figure 5:
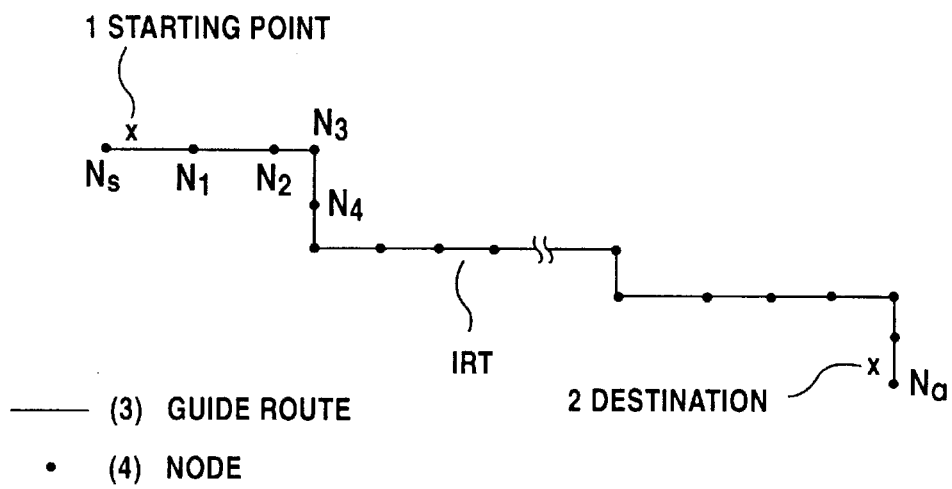
FIG. 5 is a diagrammatic view showing a node train forming a guide route.
Figure 6:
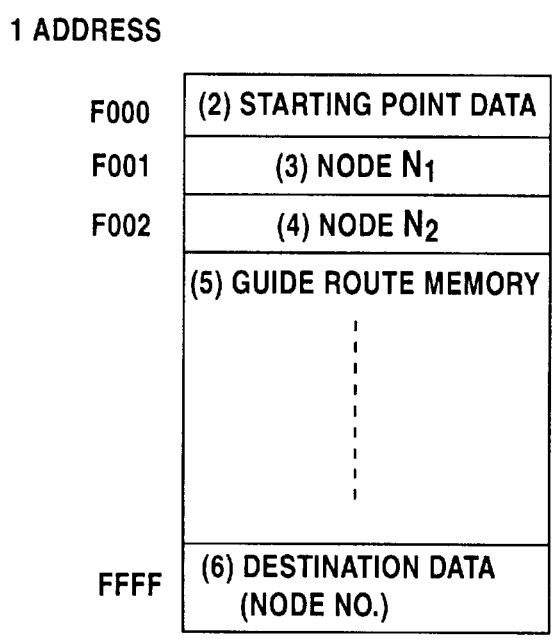
FIG. 6 is a diagrammatic view illustrating guide route data stored in a guide route memory shown in FIG. 4.

The navigation control apparatus 1 further includes a guide route controller 21 for performing the calculation of a guide route from a starting point to a destination both inputted to the navigation apparatus and for performing, when the vehicle goes off of the guide route and enters an off-route condition, a searching process for a route which will be hereinafter described, a guide route memory 22 for storing the guide route, and a guide route drawing section 23. In the guide route memory 22, all nodes $N_S$, $N_i$ (i=1, 2, . . . ) and $N_o$ on the guide route IRT (refer to FIG. 5) calculated by the guide route controller 21 from the starting point to the destination, are stored in such a manner as illustrated in FIG. 6. The guide route drawing section 23 reads out, during traveling of the vehicle, guide route information in the form of a node train, from the guide route memory 22 and draws the guide route on a map.

The navigation control apparatus 1 further includes an operation image production section 24 for producing various menu images (operation images) to be displayed; a mark production section 25 for producing and outputting various marks such as the self-vehicle mark, the cursor or focus, etc., and an image synthesizer 26.

Figure 7:
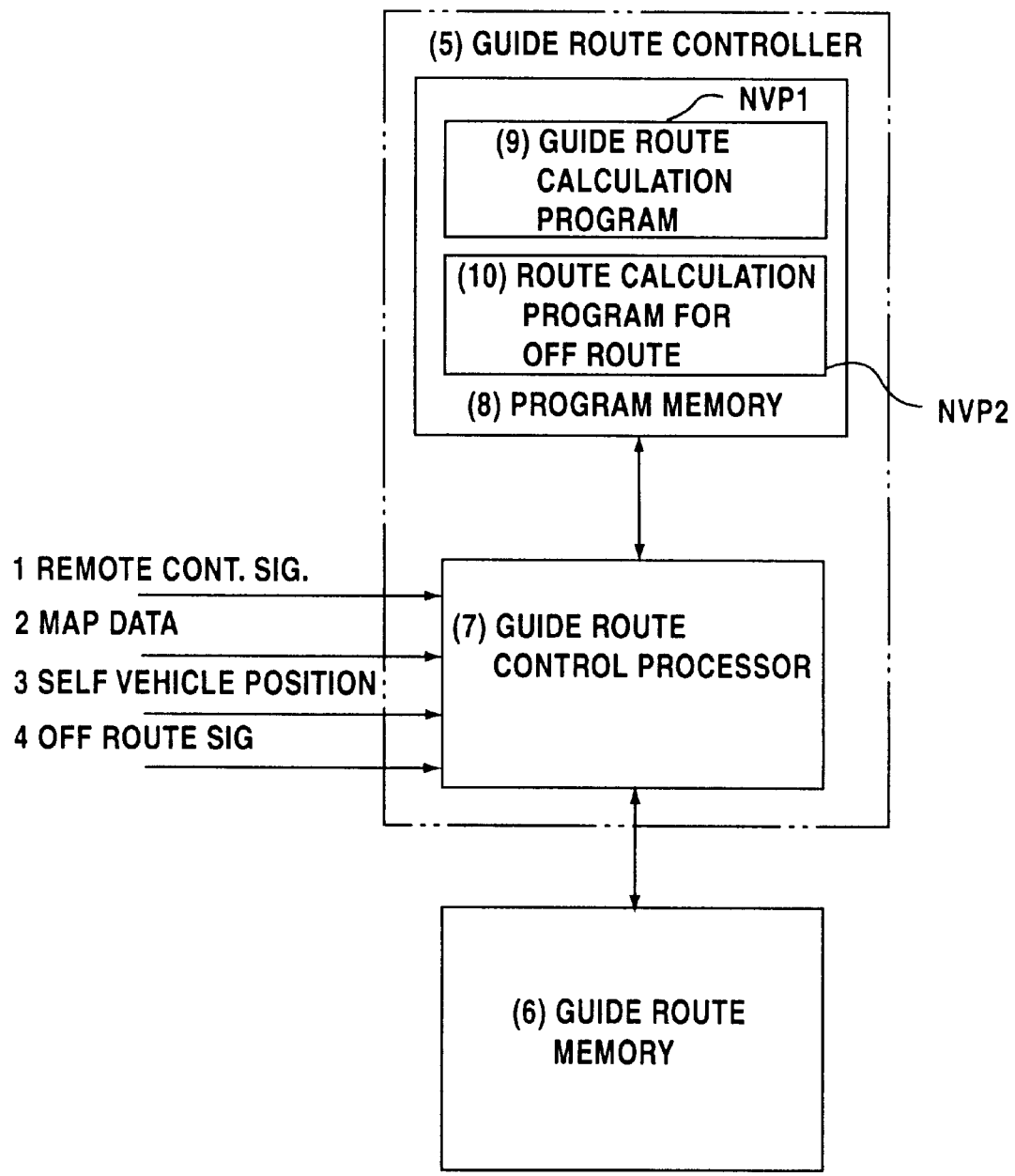
FIG. 7 is a block diagram showing a guide route controller shown in FIG. 4.

FIG. 7 shows a detailed construction of the guide route controller 21. The guide route controller 21 is shown together with the guide route memory 22 and includes a guide route control processor 31, and a program memory 32 for storing a guide route calculation program NVP1 or a route calculation program NVP2, which is used when the vehicle is in an off-route condition.

Figure 8:
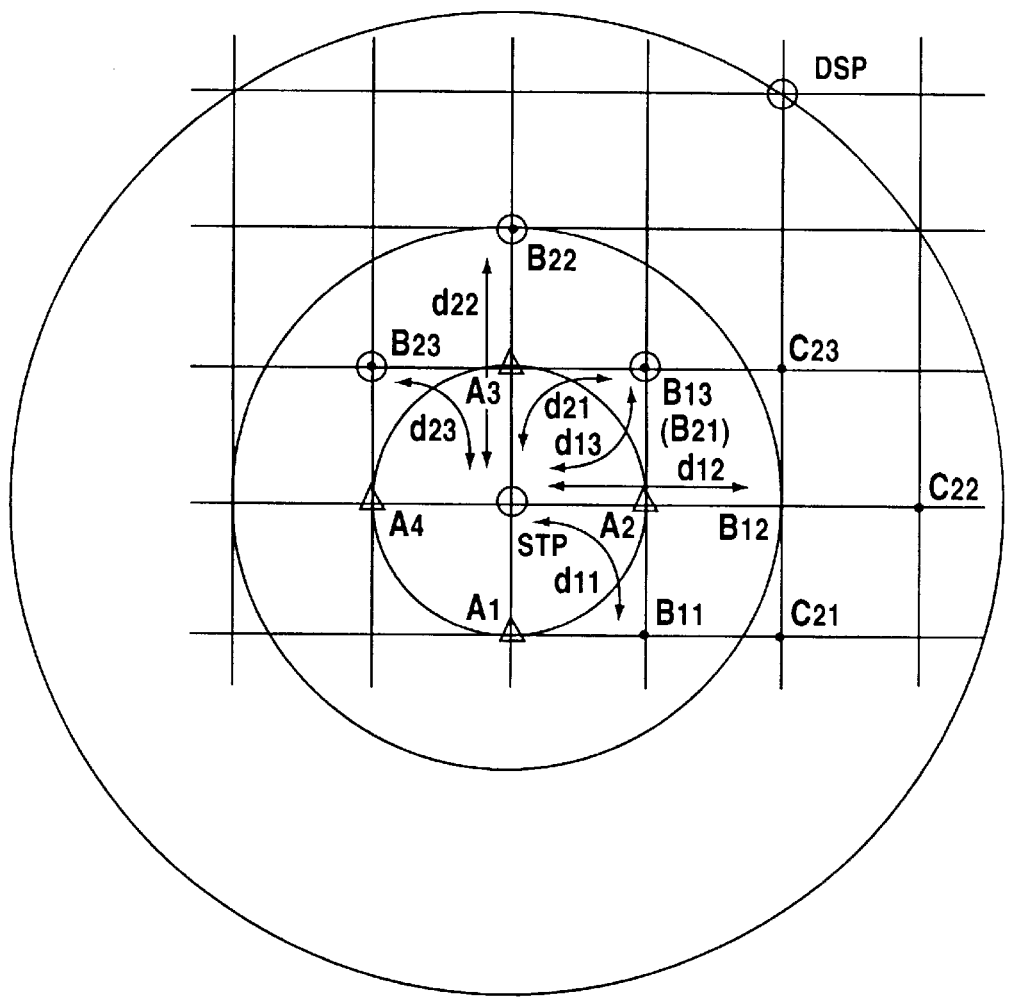
FIG. 8 is a diagrammatic view illustrating the Dijkstra method.

The guide route calculation program NVP1 is used to calculate a guide route from a starting point to a destination, and the Dijkstra method, which is known, is applied to the case wherein a shortest distance route is employed as a guide route. The Dijkstra method searches for the shortest route from a starting point to a destination taking all intersections included in a region defined by a circle whose radius is a straight line interconnecting the starting point and the destination or in a region a little greater than the region defined by the circle. FIG. 8 illustrates an outline of the Dijkstra method. Referring to FIG. 8, a map is shown as a graph wherein roads are represented by straight lines and intersections are represented as crossing points of the straight lines. The distances between adjacent intersections shown are known, and the starting point and the destination are denoted by STP and DSP, respectively.

According to the Dijkstra method, first-order intersections A1 to A4 adjacent the starting point STP are detected, and the 0th-order intersection (starting point) and the distances from the starting point to the first-order intersections A1 to A4 are stored in a memory in a corresponding relationship to the first-order intersections A1 to A4. Then, second-order intersections Bij from the first-order intersections A1 to A4 are detected, and the first-order intersections and the distances from the starting point to the second-order intersections Bij are calculated in a corresponding relationship to the second-order intersections Bij. For example, from the first-order intersection A2, three second-order intersections B11, B12, and B13 are detected, and in a corresponding relationship to the second-order intersections B11, B12 and B13.

B11: the first-order intersection A2 and the distance d11 from the starting point, B12: the first-order intersection A2 and the distance d12 from the starting point, and B13: the first-order intersection A2 and the distance d13 from the starting point . . . (a)

are stored into the memory. From the first-order intersection A3, three second-order intersection B21, B22 and B23 are detected, and in a corresponding relationship to the second-order intersections B21, B22 and B23, B21: the first-order intersection A3 and the distance d21 from the starting point, . . . (b)

B22: the first-order intersection A3 and the distance d22 from the starting point, and B23: the first-order intersection A3 and the distance d23 from the starting point are stored into the memory. Also from the other first-order intersections A1 and A4, second-order intersections are calculated and stored as data into the memory in a similar manner.

The intersections B13 and B21 are identical with each other. When intersections whose data are to be stored overlap with each other in this manner, the distances d13 and d21 from the starting point are compared with each other in magnitude, and only that data which exhibits a lower value is stored. For example, if d13>d21, then the data of (b) is finally stored as data of the intersection B13 (=B21) whereas the data of (a) is deleted.

Thereafter, third-order intersections Cij from the second-order intersections are detected and then the second-order intersections and the distances from the starting point are calculated and stored in a corresponding relationship to the third-order intersections in a similar manner, Thus, generally if (i+1)-order intersections are detected from i-order intersections and the i-order intersections and the distances from the starting point are stored into the memory in a corresponding relationship to the (i+1)-order intersections, the destination DSP is finally reached.

After the destination DSP is reached, a route obtained by successively interconnecting the (m−1)-order intersection stored corresponding to the destination (given as an m-order intersection), and the (m−2)-order intersection stored corresponding to the (m−1)-order intersection, . . . , the first-order intersection stored corresponding to the second-order intersection and the 0-order intersection (starting point) stored corresponding to the first-order intersection makes the shortest route. It is to be noted that an optimum guide route is determined actually taking such a condition into consideration that priority is given to an expressway or to a road having a greater width.

Figure 9:
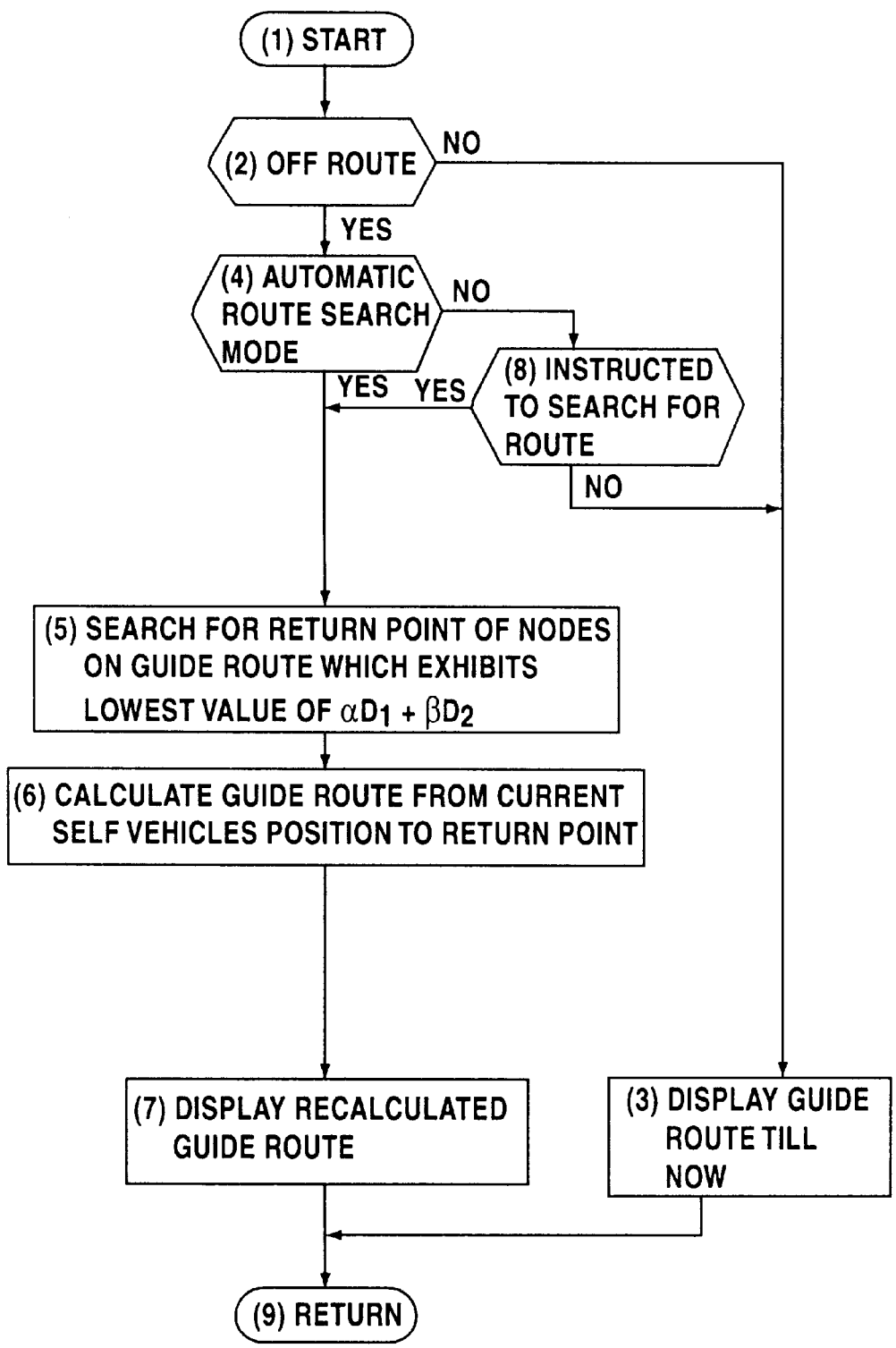
FIG. 9 is a flow chart illustrating the guide route re-calculation processing of the guide route controller of FIG. 7, when a vehicle is in an off-route condition.

The route calculation program NVP2 for an off-route condition is used to re-calculate a guide route when the vehicle enters an off-route condition, and is illustrated in a flow chart of FIG. 9.

Referring to FIG. 9, the guide route control processor 31 in the guide route controller 21 supervises a signal from the map matching controller 20 (FIG. 4) to determine whether or not an off-route condition is entered at Step 101. When an off-route condition is not determined, the navigation apparatus guides the vehicle in accordance with a guide route which is currently being used at Step 102.

Figure 10:
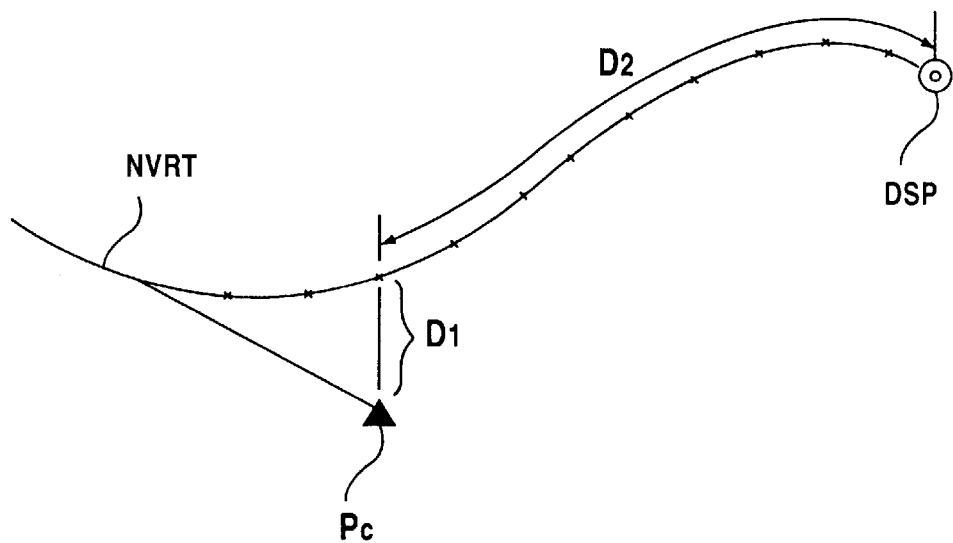
FIG. 10 is a diagrammatic view illustrating the determination of a return point by the guide route controller of FIG. 7.

However, if an off-route signal is received from the map matching controller 20, then the guide route controller processor 31 starts processing in accordance with the route calculation program NVP2 for an off-route condition. In particular, the guide route control processor 31 first checks whether or not the navigation apparatus is in the automatic route search on mode at Step 103. If the navigation apparatus is in the automatic route search on mode, then the guide route control processor 31 calculates rectilinear distances D1 from the vehicle position Pc to all of the nodes (each being indicated by an "X") on the guide route NVRT which have not been passed by the vehicle as yet and route distances D2 from the nodes to the destination DSP along the guide route NVRT as shown in FIG. 10. Then, sums D of modified or corrected distances $\alpha \cdot D1$ and $\beta \cdot D2$ are calculated using the following equation (5):

$$D = \alpha \cdot D1 + \beta \cdot D2 \qquad (5)$$

where $\alpha < \beta$, and for example, $\alpha = 0.3$ and $\beta = 0.7$. In other words, for each node, a sum D of modified distances $\alpha \cdot D$ and $\beta \cdot D$ when the distances D1 and D2 are modified setting the weighting coefficient $\beta$ for the route distance D2 to a value higher then the weighting coefficient $\alpha$ of the rectilinear distance D1 is calculated. Thereafter, a node whose sum D of modified distances exhibits the lowest value is determined as a return point at Step 104.

After the return point is determined, the guide route control processor 31 searches for a route from the vehicle position in an advancing direction of the vehicle toward the return point from one direction using the Dijkstra method or the like at Step 105. Then, the guide route control processor 31 causes the thus searched out route to be displayed, guides the vehicle toward the return point, and guides, the vehicle to the destination along the initial guide route at Step 106, after the vehicle reaches the return point.

On the other hand, when the navigation apparatus is in the automatic route search off mode in Step 103, the guide route control processor 31 supervises a signal from the map matching controller 20 to detect whether or not an instruction to search for a route is received from the remote controller 2 at Step 107, and if an instruction to search for a route is not received from the remote controller 2, then the guide route which is currently being used is displayed at Step 102. However, if an instruction to search for a route is received after an off-route condition is entered, then route searching is performed by the process beginning with Step 104.

Figure 11:
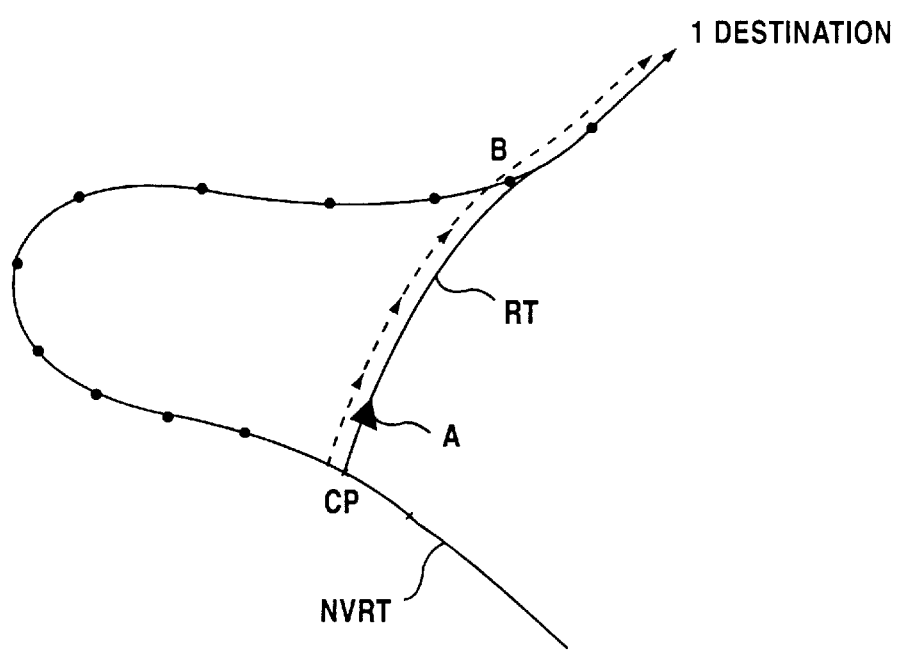
FIG. 11 is a diagrammatic view illustrating route searching by the navigation apparatus of FIG. 1.

As described above, by determining a node whose sum of modified distances is calculated using the equation (5) given hereinabove as a return point, the return point is determined by attaching greater importance to the route distance D2 rather than the rectilinear distance D1. As a result, a route which gives a comparatively short total traveling distance from the vehicle position to the destination can be searched out. For example, if the vehicle travels along the guide route NVRT indicted by a solid line in FIG. 11 and enters an off-route condition at a point CP, then if the navigation apparatus is in the automatic route search on mode, then route searching is started immediately, but if the navigation apparatus is in the automatic route search off mode, route searching is started when an instruction to search for a route is received. In such route searching, the navigation apparatus determines the node B as a return point by the processing described above and searches for a route RT from the point A to the point B. As a result, the navigation apparatus can guide the vehicle along the route RT which is a comparatively short travel distance to the destination.

It is to be noted that, while, in the foregoing description, the calculation of the equation (5) is performed for all of those nodes which have not been passed by the vehicle as yet, the route calculation program NVP2 for an off-route condition may be configured such that the calculation of the equation (5) is performed successively for the nodes in the passing order in the guide route and a node at which the value of D exhibits a change from decrease to increase with respect to the value of D at the immediately preceding node is determined as a return point and the calculation for the following nodes is omitted.

Figure 12:
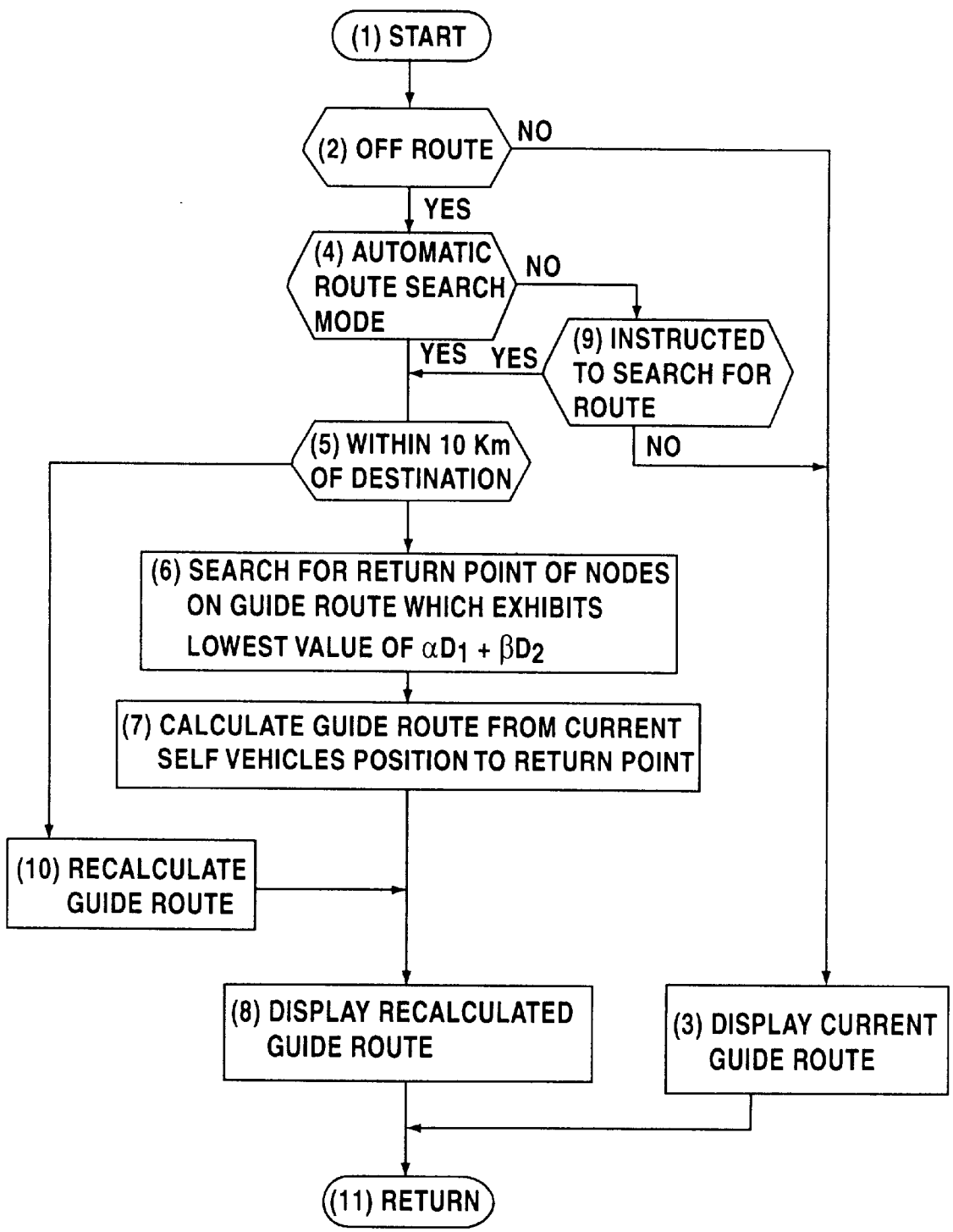
FIG. 12 is a flow chart illustrating an alternative guide route re-calculation process of the guide route controller of FIG. 7, when a vehicle is in an off-route condition.

FIG. 12 is a flow chart illustrating an alternative route calculation process for an off-route condition. In the route calculation process described in paragraph (c) above, the rectilinear distance from the vehicle position to the destination at the point of time of route searching is not taken into consideration. In contrast, in this alternative route calculation process, calculation of a guide route is performed taking the rectilinear distance from the vehicle position to the destination into consideration.

The guide route control processor 31 (FIG. 7) sends a signal from the map matching controller 20 (FIG. 4) to detect whether or not the vehicle is in an off-route condition (Step 111). If the vehicle is not in an off-route condition, then the navigation apparatus guides the vehicle in accordance with the current guide route at Step 112.

However, if an off-route signal is inputted from the map matching controller 20 to the guide route control processor 31, then the guide route control processor 31 starts processing in accordance with the route calculation program NVP2 for an off-route condition. First, the guide route control processor 31 checks whether or not the navigation apparatus is in the automatic route search on mode (Step 113). If the navigation apparatus is in the automatic route search on mode, then the guide route control processor 31 calculates a rectilinear distance D3 from the vehicle position to the destination and discriminates whether or not the rectilinear distance D3 is equal to or smaller than a preset value, for example, 10 Km (Step 114). If the rectilinear distance D3 is greater than the preset value, or in other words, if the vehicle is spaced by a comparatively large distance from the destination, the guide route control processor 31 calculates a return point and searches for a route to the return point in a manner similar to the route calculation process described above. In particular, the guide route control processor 31 calculates rectilinear distances D1 from the vehicle position Pc to all of those nodes on the guide route NVRT (FIG. 10) which have not as yet been passed by the vehicle and route distances D2 from the nodes to the destination DSP along the guide route NVRT. Then, the guide route control processor 31 calculates sums D of modified distances α·D1 and β·D2 using the equation (5) and determines a node whose sum D of modified distances exhibits the lowest value as a return point (Step 115).

After the return point is determined, the guide route control processor 31 searches for a route from the vehicle position in an advancing direction of the vehicle toward the return point from one direction using the Dijkstra method or the like (Step 116). Then, the guide route control processor 31 causes the thus searched out route to be displayed, guides the vehicle toward the return point, and after the vehicle returns to the return point, guides the vehicle to the destination along the initial guide route (Step 117).

On the other hand, when the navigation apparatus is in the automatic route search off mode in Step 113, the guide route control processor 31 generates a signal from the map matching controller 20 to detect whether or not an instruction to search for a route is received from the remote controller 2 (Step 118), and if an instruction to search for a route is not received from the remote controller 2, then the current guide route is displayed (Step 112). However, if an instruction to search for a route is received after an off-route condition is entered, route searching is performed by the processing beginning with Step 104.

However, when the rectilinear distance D3 from the vehicle position to the destination is shorter than the preset distance in Step 114, the guide route control processor 31 re-calculates the guide route from the vehicle position to the destination (Step 119). Thereafter, the guide route control processor 31 causes the thus re-calculated guide route to be displayed and guides the vehicle along the guide route (Step 117).

As described above, if the vehicle enters an off-route condition near the destination, then the navigation apparatus re-calculates the guide route to the destination and guides the vehicle along the re-calculated guide route. Consequently, a situation in which a route is set in a direction where the vehicle travels away from the destination or a route which makes the vehicle take a round about way to the destination is searched, as may occur with a conventional navigation apparatus, is eliminated.

Figure 13:
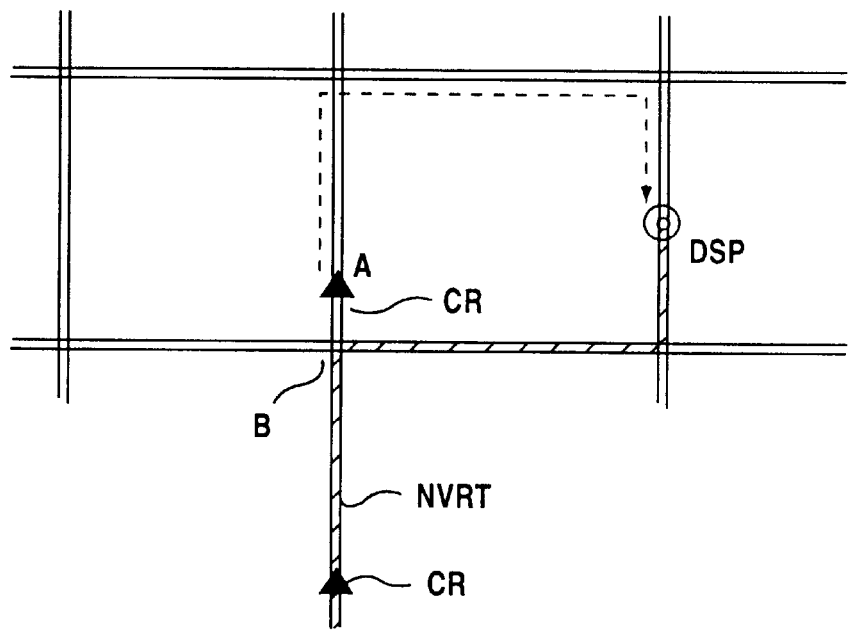
FIGS. 13 and 14 are diagrammatic views illustrating different techniques of route searching by the navigation apparatus of FIG. 1.
Figure 14:
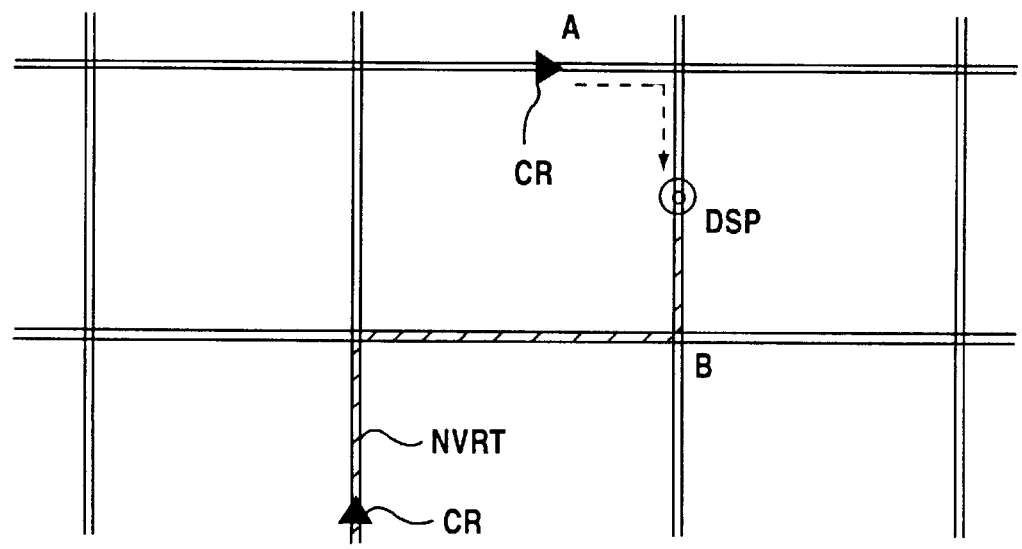
Figure 15:
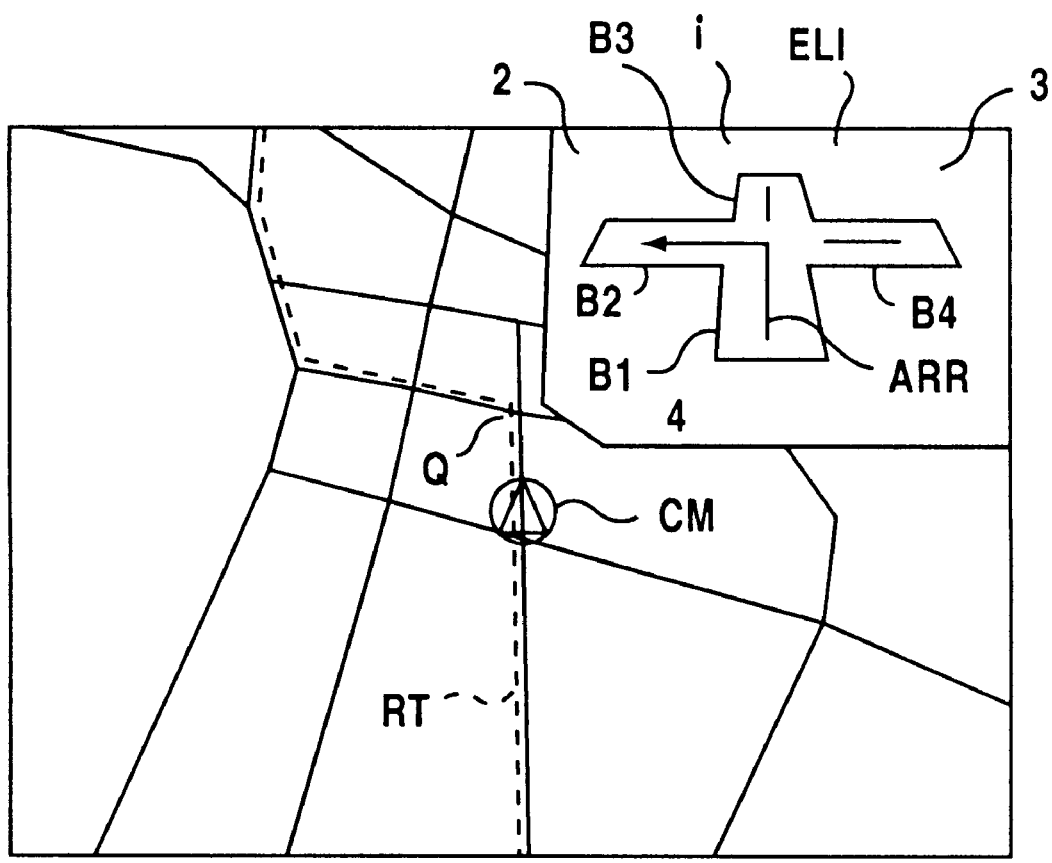
FIG. 15 is a schematic view showing an intersection location map.
Figures 16, 17:
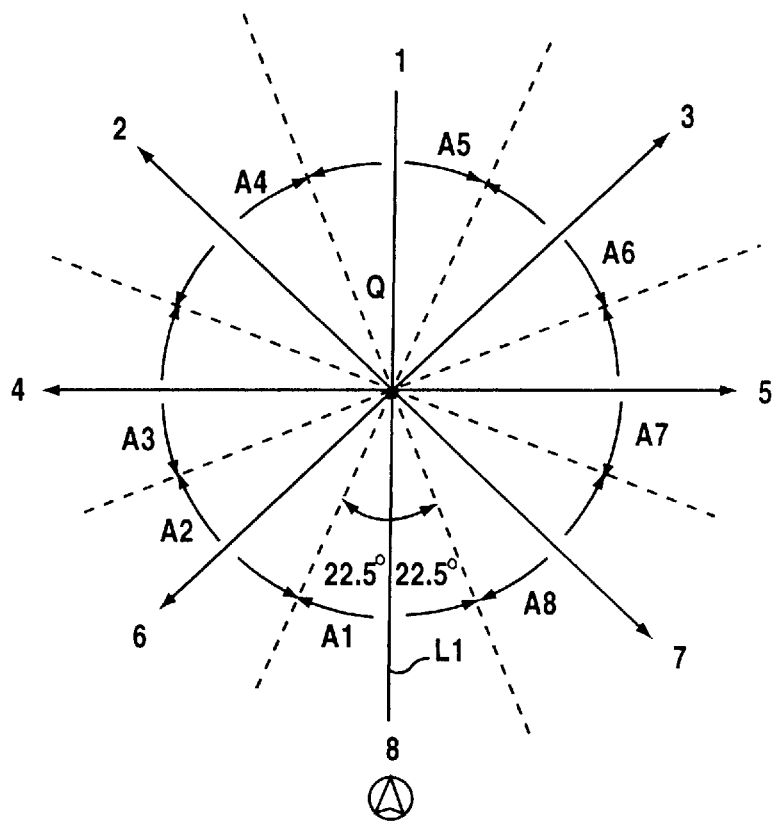
FIG. 16 is a diagrammatic view illustrating an intersection enlarged map drawing method.
FIG. 17 is a table illustrating messages for guidance by voice.
Figure 18A:
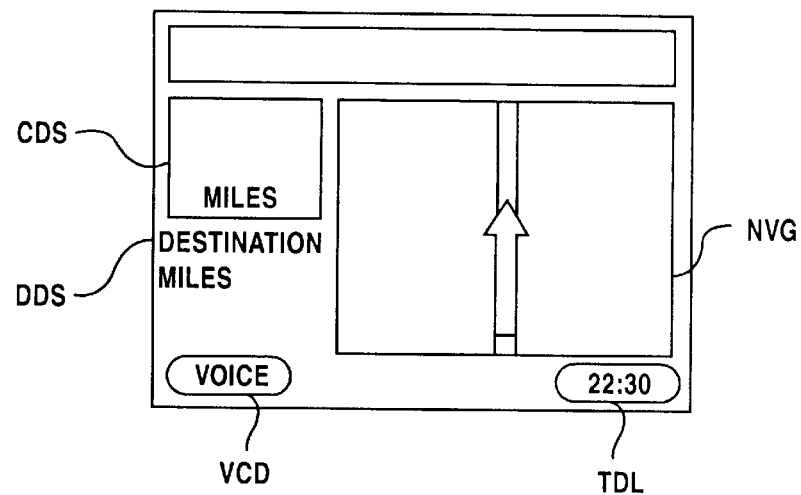
FIGS. 18A to 18F are schematic views showing different guidance screens in the United States.
Figure 18B:
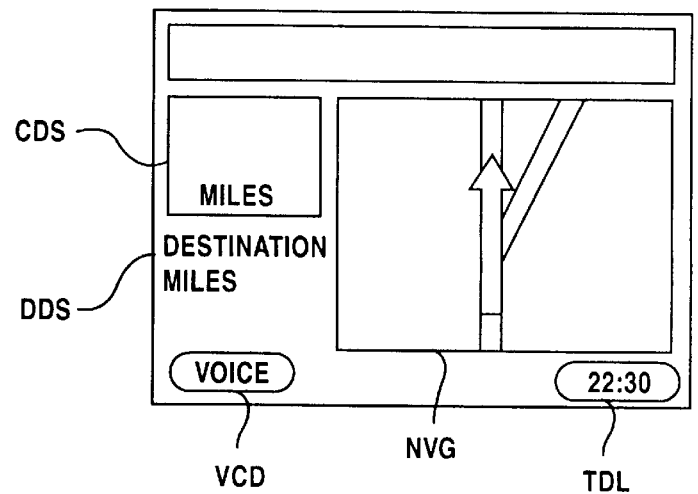
Figure 18C:
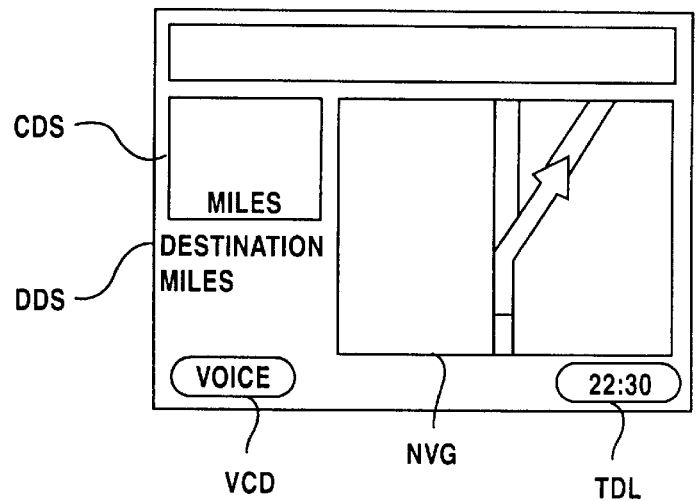
Figure 18D:
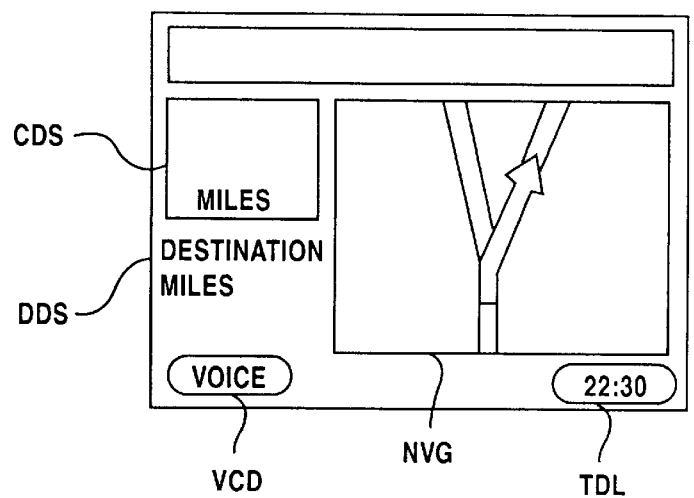
Figure 18E:
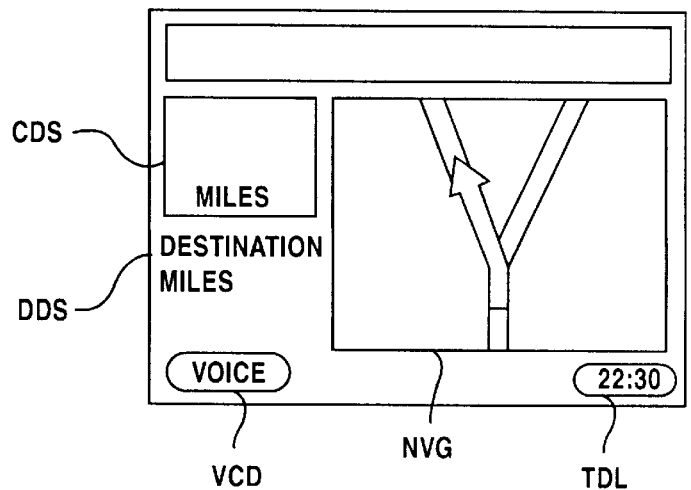
Figure 18F:
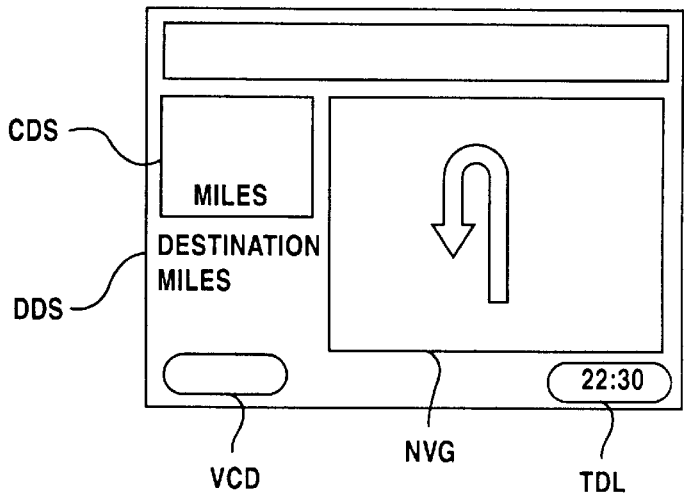
Figure 19:
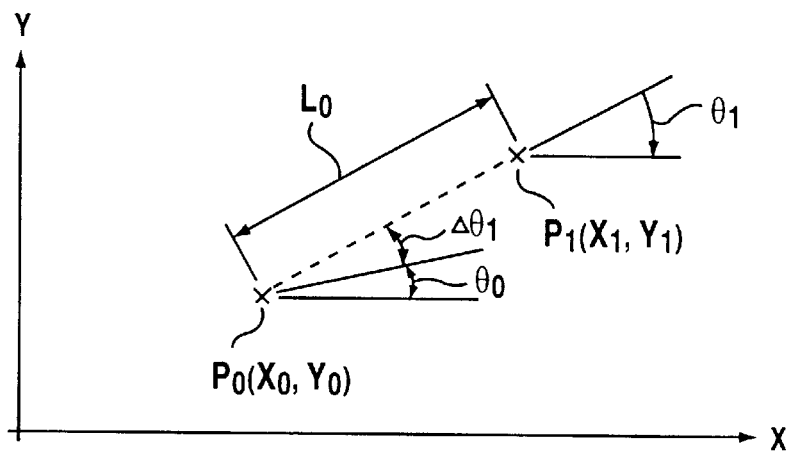
FIG. 19 is a diagrammatic view illustrating calculation of a position and an orientation using a self-contained navigation method.
Figure 20:
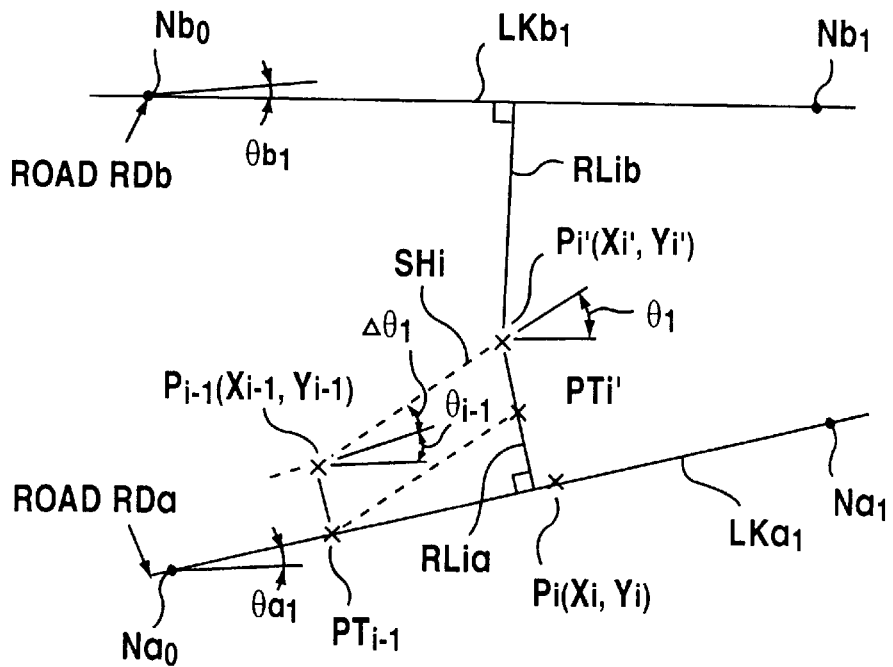
FIGS. 20 and 21 are diagrammatic views illustrating different techniques of map matching based upon a projection method.
Figure 21:
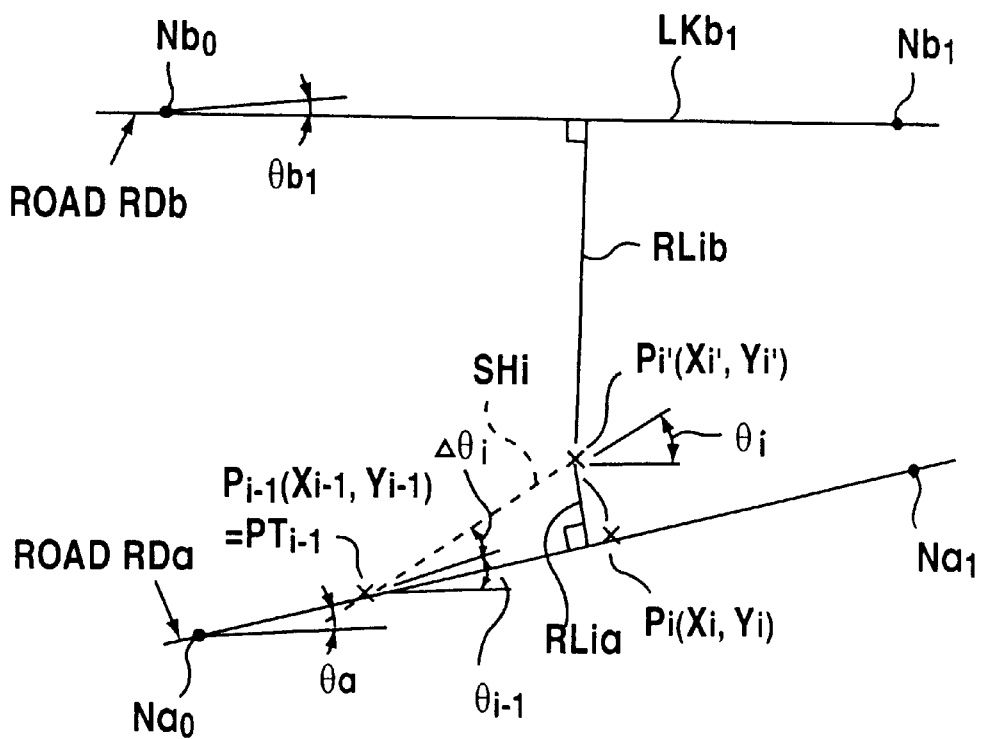
Figure 22:
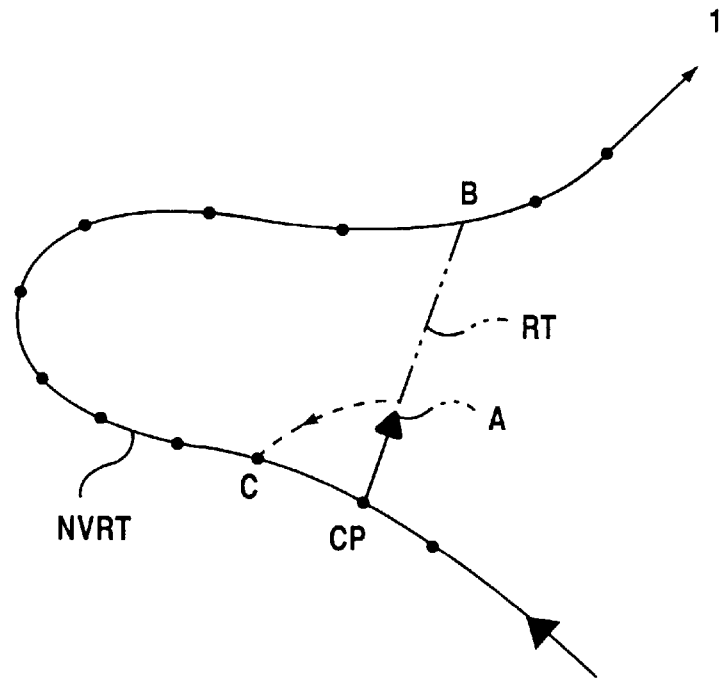
FIG. 22 is a diagrammatic view illustrating a problem encountered in a conventional route searching method.
Figure 23:
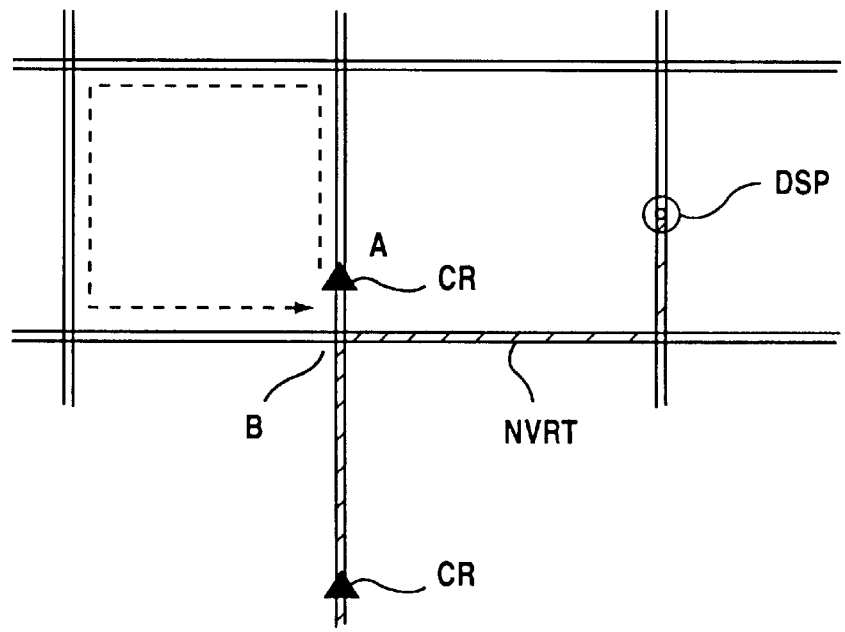
FIGS. 23 and 24 are diagrammatic views illustrating another problem encountered in a conventional route searching method.
Figure 24:
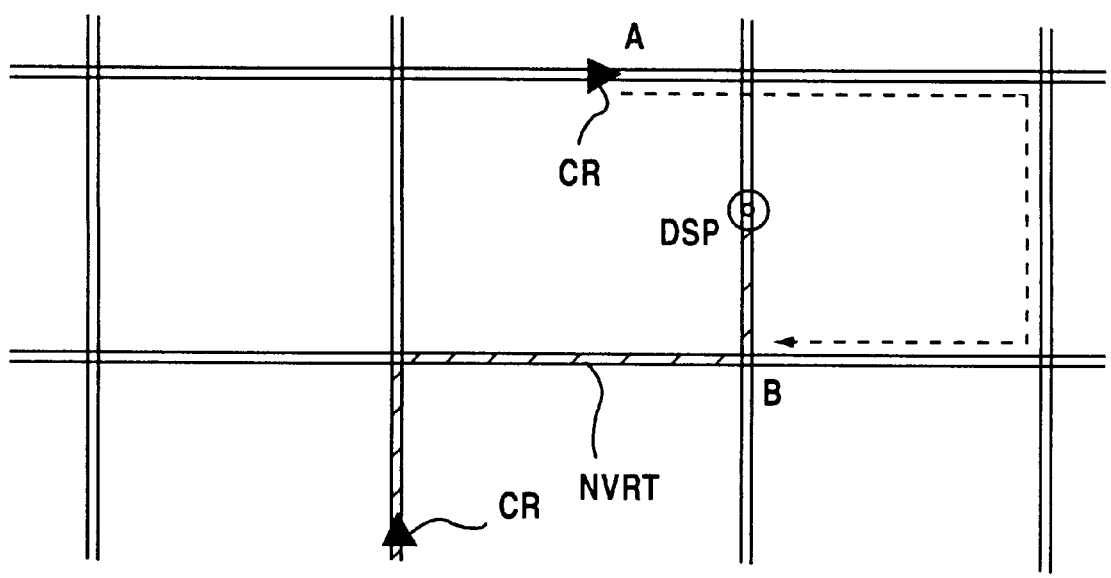

FIGS. 13 and 14 illustrate different ways of route searching in this instance. In FIGS. 13 and 14, a guide route indicated by cross hatched lines is denoted at NVRT, a vehicle is denoted at CR, and a destination is denoted at DSP. Referring to FIG. 13, if the vehicle enters an off-route condition from the guide route NVRT, then if the navigation apparatus is in the automatic route search mode, route searching is started immediately. In this instance, since the distance from the point A, at which the vehicle enters an off-route condition, to the destination is shorter than a preset distance, the navigation apparatus performs re-calculation of the guide route from the point A to the destination DSP calculated to obtain a guide route indicated by a broken line in FIG. 13, and guides the vehicle along the thus obtained guide route.

On the other hand, referring to FIG. 14, if the vehicle enters an off-route condition from the guide route NVRT (the navigation apparatus is not in an automatic route search mode) and then an instruction to search for a route is received from the remote controller after the vehicle travels to the point A, since the distance from the point A, at which the vehicle enters an off-route condition, to the destination is shorter than the preset distance, the navigation apparatus performs re-calculation of the guide route from the point A to the destination DSP to obtain a guide route indicated by a broken line in FIG. 14 and guides the vehicle along the thus obtained guide route.

Having now fully described the invention, it will be apparent to one of ordinary skill in the art that many changes and modifications can be made thereto without departing from the spirit and scope of the invention as set forth herein.

We claim:

1. A navigation apparatus for guiding, a traveling vehicle to a destination along a guide route having a plurality of nodes thereon, said apparatus comprising:

an off-route detection means for detecting an off-route condition when the vehicle travels along a road displaced from the guide route;

a guide route searching means for searching for a route to return the vehicle to the guide route, when the vehicle is in the off-route condition; and a display means for displaying an image for guiding the vehicle along the guide route;

wherein said guide route searching means includes means for calculating when the vehicle is the an off-route condition, rectilinear distances from the position of the vehicle to nodes on the guide route and route distances from the nodes to the destination along the guide route, means for modifying the rectilinear distances and the route distances using first and second weighting coefficients, respectively, the second weighting coefficient being greater than the first weighting coefficient, means for calculating the sums of the rectilinear and route distances modified by the first and second weighting coefficients, respectively, means for determining one of the nodes which exhibits the lowest one of the sums as a return point, and means for searching a route from the position of the vehicle to the return point; and wherein said display means displays an image for guiding the vehicle to the return point along the route searched out by said guide route searching means.

2. A navigation apparatus according to claim 1, wherein said route searching means searches for a route in a direction in which the vehicle is advancing towards the return point from one direction.

3. A navigation apparatus for guiding a vehicle to a destination along a guide route having a plurality of nodes thereon, said apparatus comprising:

an off-route detection means for detecting an off-route condition where the vehicle runs along a road displaced from the guide route;

a guide route searching means for searching for a route to return the vehicle to the guide route, when the vehicle is in the off-route condition; and a display means for displaying an image for guiding the vehicle along the guide route;

wherein said guide route searching means includes means for calculating when the vehicle is in the off-routine condition, a rectilinear distance from a position of the vehicle to the destination, means for searching for the guide route from the position of the vehicle to the destination when the rectilinear distance is equal to or smaller than a preset value, and means for determining when the rectilinear distance is greater than the preset value, a return point on the guide route, along which the vehicle has traveled, and means for searching for a route from the position of the vehicle to the return point; and wherein said display means displays an image for guiding the vehicle to the destination along the route searched by said guide route searching means.

4. A navigation apparatus according to claim 3, wherein, when the rectilinear distance from the position of the vehicle to the destination is greater than the preset value, said guide route searching means calculates rectilinear distances from the position of the vehicle to nodes on the guide route and route distances from the nodes to the destination along the guide route, modifies the rectilinear distances and the route distances using first and second weighting coefficients, respectively, wherein the second weighting coefficient is greater than the first weighting coefficient, calculates sums of the rectilinear and route distances modified by the first and second weighting coefficients, respectively, and determines the node which exhibits the lowest one of the sums, as a return point.

5. A navigation method for guiding a vehicle to a destination along a guide route having a plurality of nodes thereon, said method including the steps of:

(a) detecting an off-route condition when the vehicle travels along a road not located on a current guide route;

(b) calculating, when the vehicle is in an off-route condition, rectilinear distances from the position of the vehicle to the nodes on the guide route and distances from the nodes to the destination along the guide route;

(c) multiplying the rectilinear distances and the route distances by first and second weighting coefficients wherein the second weighting coefficient is greater than the first weighting coefficient;

(d) calculating the sums of the modified rectilinear and route distances;

(e) determining the node which has the lowest sum as the return point of the vehicle to the guide route;

(f) determining a route from the position of the vehicle to the return point; and (g) communicating the route from the position of the vehicle to the return point, to an operator of the vehicle.

6. A navigation method as set forth in claim 5, wherein determining a route from the position of the vehicle to the return point is determined in a direction in which the vehicle is advancing.

7. A navigation method as set forth in claim 5, wherein the steps (b)–(f) are performed automatically when an off-route condition is detected.

8. A navigation method as set forth in claim 5, wherein the steps (b)–(f) are performed in response to a command instruction.

9. A method for guiding a vehicle to a destination along a guide route, said method including the steps of:

(a) detecting an off-route condition when the vehicle travels along a road not located on a current guide route;

(b) calculating a rectilinear distance from the position of the vehicle to the destination, (c) determining a new guide route from the position of the vehicle to the destination when the rectilinear distance is equal to or less than a predetermined value;

(d) determining a return point on the current guide route when the rectilinear distance is greater than the predetermined value, and determining a route from the position of the vehicle to the return point; and (e) communicating to the operator of the vehicle, route information for guiding the vehicle to the destination along the determined route.

10. A method for guiding a vehicle as set forth in claim 9, wherein when the rectilinear distance from the position of the vehicle to the destination is greater than the predetermined distance, the method includes the steps of:

(a) calculating the rectilinear distances from the position of the vehicle to nodes on the guide route and route distances from the nodes to the destination along the guide route;

(b) multiplying the rectilinear distance route distances by first and second weighting coefficients, respectively, wherein the second weighting coefficient is greater than the first weighting coefficient;

(c) calculating the sums of the rectilinear distances and route distances multiplied by their respective weighting coefficients; and (d) determining the node which has the lowest sum as the return point of the vehicle to the guide route.

11. A method as set forth in claim 9, wherein the steps (b)–(d) are performed automatically when an off-route condition is detected.

12. A navigation method as set forth in claim 9, wherein the steps (b)–(d) are performed in response to a command instruction.

* * * * *